United States Patent
Gurev et al.

(10) Patent No.: US 12,437,194 B2
(45) Date of Patent: Oct. 7, 2025

(54) MECHANISTIC MODEL PARAMETER INFERENCE THROUGH ARTIFICIAL INTELLIGENCE

(71) Applicant: International Business Machines Corporation, Armonk, NY (US)

(72) Inventors: Viatcheslav Gurev, Bedford Hills, NY (US); James R. Kozloski, New Fairfield, CT (US); Kenney Ng, Arlington, MA (US); Jaimit Parikh, Danbury, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1034 days.

(21) Appl. No.: 17/360,666

(22) Filed: Jun. 28, 2021

(65) Prior Publication Data
US 2022/0414452 A1   Dec. 29, 2022

(51) Int. Cl.
| G06N 3/08 | (2023.01) |
| G06N 3/045 | (2023.01) |
| G06N 3/094 | (2023.01) |

(52) U.S. Cl.
CPC .............. *G06N 3/08* (2013.01); *G06N 3/045* (2023.01); *G06N 3/094* (2023.01)

(58) Field of Classification Search
CPC .................................. G06N 3/094; G06N 3/09
See application file for complete search history.

(56) References Cited

U.S. PATENT DOCUMENTS

| 11,174,289 | B1 | 11/2021 | Das et al. |
| 2015/0294218 | A1 | 10/2015 | Thomson et al. |
| 2019/0026869 | A1* | 1/2019 | Gupta ............... G06N 3/094 |
| 2020/0233920 | A1* | 7/2020 | Meeds ............ G06V 20/698 |
| 2020/0342359 | A1 | 10/2020 | Hu et al. |
| 2022/0414451 | A1 | 12/2022 | Gurev et al. |
| 2023/0045548 | A1 | 2/2023 | Yakut et al. |

OTHER PUBLICATIONS

Xu, K., & Darve, E. (2021). Solving inverse problems in stochastic models using deep neural networks and adversarial training. Computer Methods in Applied Mechanics and Engineering, 384, 113976. (Year: 2021).*

(Continued)

*Primary Examiner* — Schyler S Sanks
(74) *Attorney, Agent, or Firm* — Amin, Turocy & Watson, LLP

(57) ABSTRACT

Techniques regarding inferring parameters of one or more mechanistic models are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise a machine learning component that can identify a causal relationship in a mechanistic model via a machine learning architecture that employs a parameter space of the mechanistic model as a learned distribution sampled within a generative adversarial network.

20 Claims, 25 Drawing Sheets
(14 of 25 Drawing Sheet(s) Filed in Color)

(56) References Cited

OTHER PUBLICATIONS

Mirza, Mehdi, and Simon Osindero. "Conditional generative adversarial nets." arXiv preprint arXiv:1411.1784 (2014). (Year: 2014).*

Nguyen, Tu, et al. "Dual discriminator generative adversarial nets." Advances in neural information processing systems 30 (2017). (Year: 2017).*

Berthelot, David. "BEGAN: Boundary Equilibrium Generative Adversarial Networks." arXiv preprint arXiv:1703.10717 (2017) (Year: 2017).*

McMahon, et al., "A general mechanistic model enables predictions of the biological effectiveness of different qualities of radiation," Published Online Sep. 7, 2017, Scientific Reports | 7: 10790 | DOI:10.1038/s41598-017-10820-1, 15 pages.

Stites, "Chemical kinetic mechanistic models to investigate cancer biology and impact cancer medicine," Publication Info: Physical Biology 10.2: 026004 (6 .). IOP Publishing Ltd. (Apr. 2013), 7 pages.

Hahn, "Solving Inverse Problems for Mechanistic Systems Biology Models with Unknown Inputs. Final Report for Jan. 1-Sep. 30, 2014," Publication info: National Technical Information Service . (Oct. 16, 2014), 31 pages.

Srivastava, et al., "VEEGAN: Reducing Mode Collapse in GANs using Implicit Variational Learning," arXiv:1705.07761v3 [stat.ML] Nov. 6, 2017, 17 pages.

Parikh, et al., "Integration of AI and Mechanistic Modeling in Generative Adversarial Networks for Stochastic Inverse Problems," Jan. 29, 2021, 19 pages.

Kingma, et al., Improving Variational Inference with Inverse Autoregressive Flow. arXiv:1606.04934v2 [cs.LG] Jan. 30, 2017, https://arxiv.org/abs/1606.04934, 16 pages.

Oord, et al., "Parallel WaveNet: Fast High-Fidelity Speech Synthesis," arXiv:1711.10433v1 [cs.LG] Nov. 28, 2017, https://arxiv.org/abs/1711.10433, 11 pages.

Poole, et al., "Inference for Deterministic Simulation Models The Bayesian Melding Approach," Technical Report No. 346, Department of Statistics, University of Washington, Dec. 1998, 57 pages.

Papamakarios, et al., Masked Autoregressive Flow for Density Estimation. rXiv:1705.07057v4 [stat.ML] Jun. 14, 2018, https://arxiv.org /abs/1705.07057, 17 pages.

Poole, et al., Inference for Deterministic Simulation Models: The Bayesian Melding Approach. Poole and Raftery 2000. https://www.tandfonline.com/doi/abs/10.1080/01621459.2000.10474324, Journal of the American Statistical Association; Dec. 2000; 95, 452; ABI/INFORM Global 12 pages.

Mell, et al., "The NIST Definition of Cloud Computing," Special Publication 800-145, Recommendations of the National Institute of Standards and Technology, Sep. 2011, 7 pages.

List of IBM Patents or Applications Treated as Related.

Neyshabur, et al., "Stabilizing GAN Training with Multiple Random Projections," arXiv:1705.07831v2 [cs.LG] Jun. 23, 2018, 21 pages.

Belghazi, et al., "Mutual Information Neural Estimation," arXiv:1801.04062v4 [cs.LG] Jun. 7, 2018, 5 pages.

Albuquerque, et al., "Multi-objective training of Generative Adversarial Networks with multiple discriminators," arXiv:1901.08680v1 [cs.LG] Jan. 24, 2019, 16 pages.

Wiatrak, et al., "Stabilizing Generative Adversarial Networks: A Survey," arXiv:1910.00927v2 [cs.LG] Mar. 24, 2020, 26 pages.

Huang, et al., "Augmented Normalizing Flows: Bridging the Gap Between Generative Flows and Latent Variable Models," arXiv:2002.07101v1 [cs.LG] Feb. 17, 2020, 27 pages.

Parikh, et al., "Integration of AI and Mechanistic Modeling in Generative Adversarial Networks for Stochastic Inverse Problems," arXiv:2009.08267v2 [stat.ML] Oct. 27, 2020, 19 pages.

Fengler, et al., "Likelihood Approximation Networks (LANs) for Fast Inference of Simulation Models in Cognitive Neuroscience, " bioRxiv preprint doi: https://doi.org/10.1101/2020.11.20.392274; this version posted Nov. 22, 2020, 37 pages.

Sugiyama, et al., "Density-ratio matching under the Bregman divergence: a unified framework of density-ratio estimation," Ann Inst Stat Math (2012) 64:1009-1044 DOI 10.1007/s10463-011-0343-8, 6 pages.

Jonsson, et al., "Nonlinearity Detection: Advantages of Nonlinear Mixed-Effects Modeling," AAPS PharmSci 2000; 2(3) article 32 (http://www.pharmsci.org), 10 pages.

Berard, et al., "Embedding Riemannian Manifolds by their Heat Kernel," Geometric and Functional Analysis, vol. 4, No. 4 (1994), 26 pages.

Belkin, et al., "Using Manifold Structure for Partially Labelled Classification," NIPS'02: Proceedings of the 15th International Conference on Neural Information Processing Systems, 8 pages.

Coifman, et al., "Geometric diffusions as a tool for harmonic analysis and structure definition of data: Diffusion maps," pp. 7426-7431—PNAS—May 24, 2005—vol. 102—No. 21.

Zitzler, et al., "Indicator-Based Selection in Multiobjective Search," Proceedings of the 8th International Conference on Parallel Problem Solving from Nature (PPSN VIII) Sep. 2004, Birmingham, UK, 10 pages.

Wang et al., "Deep generative modeling for mechanistic-based learning and design of metamaterial systems", Computer Methods in Applied Mechanics and Engineering, Sep. 7, 2020, 23 pages.

Goodfellow et al., "Generative Adversarial Nets", arXiv: 1406.2661v1 [stat. ML], Jun. 10, 2014, 9 pages.

Mecheder et al., "Adversarial variational bayes: Unifying variational autoencoders and generative adversarial networks", arXiv:1701.04722v4 [cs.LG], Aug. 6, 2017, 10 pages.

* cited by examiner

MECHANISTIC MODEL PARAMETER INFERENCE THROUGH ARTIFICIAL INTELLIGENCE

BACKGROUND

The subject disclosure relates to the use of artificial intelligence in conjunction with a mechanistic model to infer model parameters, and more specifically, to employing a parameter space of a mechanistic model as the learned distribution sampled within a machine learning network to determine one or more causal relationships characterized by the mechanistic model.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can utilize artificial intelligence to identify causal relationships characterized by one or more mechanistic models are described.

According to an embodiment, a system is provided. The system can comprise a memory that can store computer executable components. The system can also comprise a processor, operably coupled to the memory, and that can execute the computer executable components stored in the memory. The computer executable components can comprise a machine learning component that can identify a causal relationship in a mechanistic model via a machine learning architecture that can employ a parameter space of the mechanistic model as a learned distribution sampled within a generative adversarial network.

According to an embodiment, a computer-implemented method is provided. The computer-implemented method can comprise identifying, by a system operatively coupled to a processor, a causal relationship in a mechanistic model via a machine learning architecture that can employ a parameter space of the mechanistic model as a learned distribution sampled within a generative adversarial network.

According to an embodiment, a computer program product for autonomous model parameter inferencing is provided. The computer program product can comprise a computer readable storage medium having program instructions embodied therewith. The program instructions can be executable by a processor to cause the processor to: identify, by the processor, a causal relationship in a mechanistic model via a machine learning architecture that can employ a parameter space of the mechanistic model as a learned distribution sampled within a generative adversarial network.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

DETAILED DESCRIPTION

Figure 1:
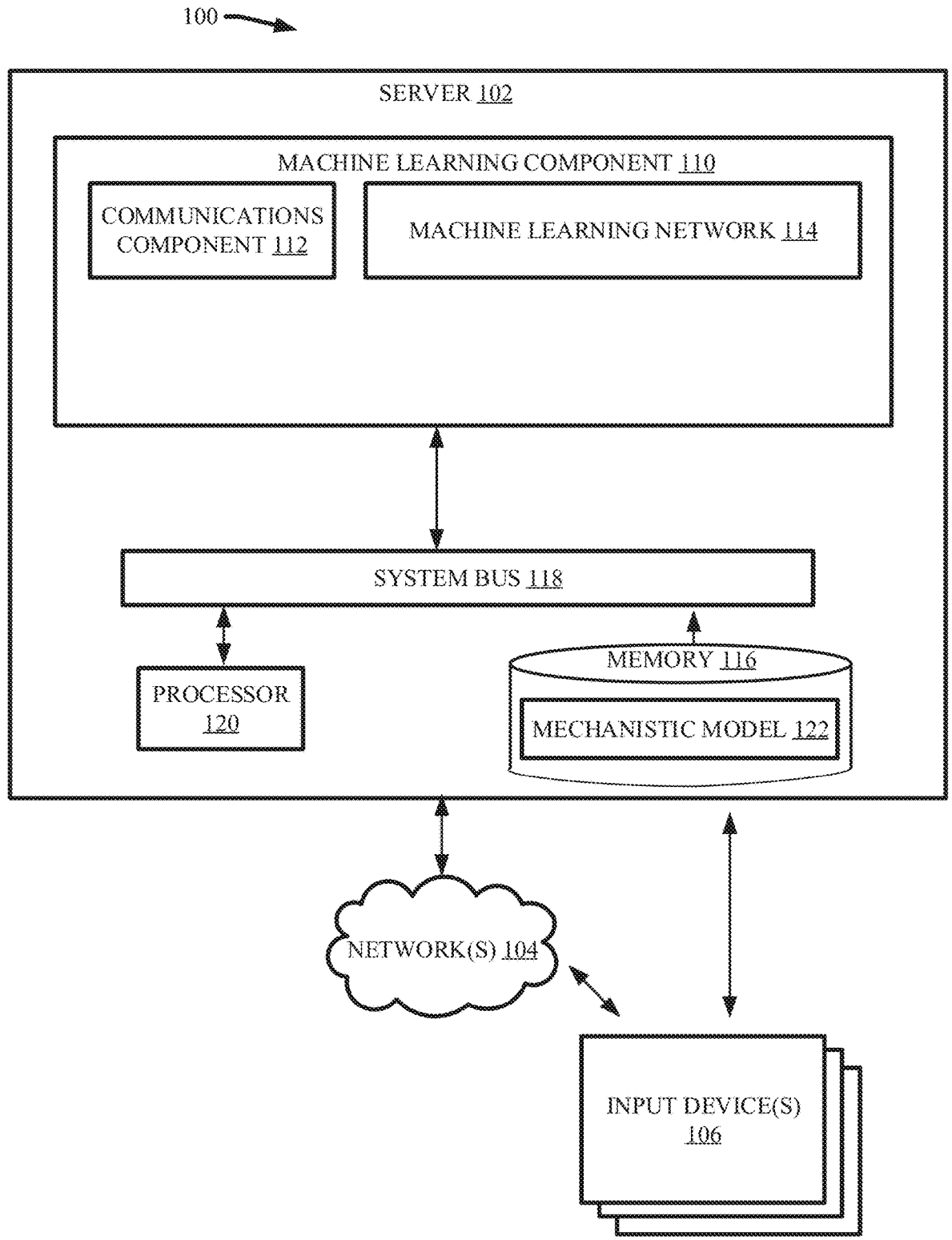
FIG. 1 illustrates a block diagram of an example, non-limiting system that can render the learned distribution sampled within a machine learning network coherent with the parameter space of one or more mechanistic model in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Mechanistic models can be used to study and understand complex biological systems. For example, the mechanistic models can be biophysical models that support clinical decision making, guiding therapeutic design, and/or early predictions of intervention outcomes and risks. However, mechanistic models can suffer from model and parameter uncertainty. Applications of the mechanistic models for decision making can require calibration to available observational data. Yet, the available calibration data can exhibit considerable variability.

Various embodiments of the present invention can be directed to computer processing systems, computer-implemented methods, apparatus and/or computer program products that facilitate the efficient, effective, and autonomous (e.g., without direct human guidance) mechanistic model parameter inference and/or generation of parameter distributions coherent to the parameter space of the mechanistic model. For example, one or more embodiments described herein can integrate mechanistic models and artificial intelligence ("AI") algorithms for the identification of mechanistic causes of observed data.

In one or more embodiments, one or more variational autoencoders ("VAEs") can be employed with one or more mechanistic models serving as surrogates, where the latent space of the VAEs can be the parameter space of the mechanistic models. For example, the one or more VAEs can generate a simple base distribution (e.g., a multivariate Gaussian distribution) in the latent space that can be transformed (e.g., via one or more bijector nodes) to the prior distribution of parameters of the mechanistic models. In another example, the base distribution can be transformed via one or more autoregressive or normalization flow algorithms. In a further example, the one or more mechanistic models can serve as the decoder for the one or more VAEs.

In one or more embodiments, one or more generative adversarial networks ("GANs") can be employed to evaluate distributions of mechanistic model input parameters that are coherent with the a given distribution of observation data. For example, the one or more GANs can be conditional GANs ("c-GANs") that can serve as probabilistic models in one or more stochastic inverse problems ("SIPs") with amortized inference. In another example, the one or more GANs can be regularized GANs ("r-GANs") in which the divergence between prior parameter distributions and observation data distributions is minimized with a generator from a given parametric family that enforces the density of the mechanistic model outputs. In another example, one or more GANs ("cr-GANs") can be regularized GANs with conditioning auxiliary variable inputs. In a further example, the one or more GANs (e.g., c-GANs)_can be trained to sample a distribution of mechanistic model input parameters. In a further example, the one or more GANs (e.g., r-GANs) can be trained to sample a distribution of mechanistic model input parameters and produce a target distribution of mechanistic model outputs. In a further example, the one or more GANs (e.g., cr-GANs) can be trained to sample a distribution of mechanistic model input parameters and produce a target distribution of mechanistic model outputs and condition the target distribution on one or more auxiliary variables (e.g., variables absent from the parameter space and/or the output domain of the mechanistic model).

The computer processing systems, computer-implemented methods, apparatus and/or computer program products employ hardware and/or software to solve problems that are highly technical in nature (e.g., parameter inference for mechanistic models), that are not abstract and cannot be performed as a set of mental acts by a human. For example, an individual, or a plurality of individuals, cannot readily construct population of deterministic models and/or identify distributions of model input parameters from stochastic observation data.

Also, one or more embodiments described herein can constitute a technical improvement over conventional parameter inference techniques by approximating the conditional probability of mechanistic model input parameters given observation data regarding the output space of the mechanistic model. Additionally, various embodiments described herein can demonstrate a technical improvement over conventional parameter inference techniques by deep learning architecture that can solve a constrained optimization formulation of SIPs for one or more mechanistic models, which can be conditioned on one or more auxiliary variables.

FIG. 1 illustrates a block diagram of an example, non-limiting system 100 that can employ deep learning architectures that integrate mechanistic models and AI algorithms for identification of mechanistic causes of observation data. Repetitive description of like elements employed in other embodiments described herein is omitted for the sake of brevity. Aspects of systems (e.g., system 100 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines (e.g., computers, computing devices, virtual machines, a combination thereof, and/or the like) can cause the machines to perform the operations described.

As shown in FIG. 1, the system 100 can comprise one or more servers 102, one or more networks 104, and/or input devices 106. The server 102 can comprise machine learning component 110. The machine learning component 110 can further comprise communications component 112 and/or machine learning network 114. Also, the server 102 can comprise or otherwise be associated with at least one memory 116. The server 102 can further comprise a system bus 118 that can couple to various components such as, but not limited to, the machine learning component 110 and associated components, memory 116 and/or a processor 120. While a server 102 is illustrated in FIG. 1, in other embodiments, multiple devices of various types can be associated with or comprise the features shown in FIG. 1. Further, the server 102 can communicate with one or more cloud computing environments.

The one or more networks 104 can comprise wired and wireless networks, including, but not limited to, a cellular network, a wide area network (WAN) (e.g., the Internet) or a local area network (LAN). For example, the server 102 can communicate with one or more input devices 106 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the machine learning component 110 can be provided on the one or more servers 102, it should be appreciated that the architecture of system 100 is not so limited. For example, the machine learning component 110, or one or more components of machine learning component 110, can be located at another computer device, such as another server device, a client device, and/or the like.

The one or more input devices 106 can comprise one or more computerized devices, which can include, but are not limited to: personal computers, desktop computers, laptop computers, cellular telephones (e.g., smart phones), computerized tablets (e.g., comprising a processor), smart watches, keyboards, touch screens, mice, a combination thereof, and/or the like. The one or more input devices 106 can be employed to enter one or more mechanistic models 122 and/or observational data into the system 100, thereby sharing (e.g., via a direct connection and/or via the one or more networks 104) said data with the server 102. For example, the one or more input devices 106 can send data to the communications component 112 (e.g., via a direct connection and/or via the one or more networks 104). Additionally, the one or more input devices 106 can comprise one or more displays that can present one or more outputs generated by the system 100 to a user. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

In various embodiments, the one or more input devices 106 and/or the one or more networks 104 can be employed to input one or more settings and/or commands into the system 100. For example, in the various embodiments described herein, the one or more input devices 106 can be employed to operate and/or manipulate the server 102 and/or associate components. Additionally, the one or more input devices 106 can be employed to display one or more outputs (e.g., displays, data, visualizations, and/or the like) generated by the server 102 and/or associate components. Further, in one or more embodiments, the one or more input devices 106 can be comprised within, and/or operably coupled to, a cloud computing environment.

In one or more embodiments, the one or more input devices 106 can be employed to enter one or more mechanistic models 122 into the system 100, which can be stored, for example, in the one or more memories 116 (e.g., as shown in FIG. 1). The machine learning component 110 can infer one or more causal relations characterized by the one or more mechanistic models 122 by utilizing a parameter space of the one or more mechanistic models 122 as a latent space or as a distribution to sample in one or more machine learning networks 114. For example, the one or more mechanistic models 122 can characterize biophysical processes of a biological system. For instance, model parameters can be employed in the one or more mechanistic models 126 to characterize effects of interventions on populations of experimental subjects induced by changes in experimental conditions such as temperature, concentrations of therapeutic compounds, external mechanical, electrical stimuli, and/or the like. A major complication of experimental design can be due to variability of characteristics in the subject populations.

In various embodiments, the machine learning component 110 can identify input parameters of a mechanistic model 122 for multiple conditions disguised by one or more given factors by analyzing the one or more mechanistic models 122 in the context of a stochastic inverse problem ("SIP"). As used herein, SIP can refer to a task of constructing populations of deterministic models and identifying distributions of model input parameters from stochastic observations. For example, sets of experimental signal waveforms $\{s_T(t): \tau \in J\} \subseteq S$ recorded from objects in a population and solutions $\{f(t; x): x \in \mathbb{R}^m\} \subseteq S$ of model differential equations can be given; where "J" is an index set, "x" is a vector of input model parameters, and "S" is a functional space of continuous time signals. Feature vectors $L(s_\tau(\bullet))$ and $L(f(\bullet; x))$ (e.g., also referred to as quantities of interest) can be extracted from experimental and simulated signals using a given map characterized by $L:S \to \mathbb{R}^m$. By analyzing the one or more mechanistic models 122 in the context of a SIP, the machine learning component 122 can employ a function of the mechanistic model 122 $y=M(x)$ that can be defined as $M(x)=L(f(\bullet; x))$. Thereby, the machine learning component 110 can identify the distribution of model input parameters $Q_X$, which, if passed through the mechanistic model 122 M, generates a distribution of model outputs that matches the distribution of features $Q_Y$ extracted from experimental signals. The model function M could be in a closed form or obtained by extracting features from numerical solutions of model differential equations.

In various embodiments described herein, the mechanistic model 122 can denote a differentiable mechanistic model or a learned surrogate ($y=M(x)$). For example, a mechanistic model 122 (M), which can be a non-invertible function with inputs as a random variable (X) and outputs as a random variable (Y), linked deterministically ($y=M(x)$), where the density of experimentally observed features ($q_Y(y)$) can be mapped to the density of model parameters ($q_X(x)$) coherent to observation data in accordance with Equation 1 below.

$$q_X(x) \equiv q_Y(y) \frac{p_X(x)}{p_Y(y)} \Big|_{y=M(x)} \quad (1)$$

Where "$p_x(x)$" is the prior density on the mechanistic model's 122 input parameters; "$p_Y(y)$" is the target density of features extracted from the observation data characterized by the mechanistic model 122 that the machine learning component 110 can target to match; "$q_Y(y)$" is the model induced prior density obtained upon sampling from $p_x(x)$ and applying the mechanistic model 122 M to the samples.

In another example, the one or more mechanistic models 122 can be associated with conditional probabilistic models for amortized inference to solve the SIP. To build the conditional model for deterministic models, a stochastic map can be introduced. For instance, A small Gaussian noise E can be introduced to model outputs $y'=M(x)+\epsilon$, $\epsilon \sim N(0, \epsilon^2 I_m)$, where m is the dimension of the model output y. The forward model takes the form of $p_{Y'|X}(y'|x)$. The surrogate of the inverse model $p_{X|Y'}(x|y'; \theta)$, with $\theta$ as parameter vector (e.g., neural network weights), can be trained on a set of pairs $\{x_i, y'_i\}$, taking $x_i$ from the prior distribution $P_X$ and calculating $y'_i$ from the forward model. Once trained, the inverse surrogate model can provide amortized inference by sampling with $y \sim q_Y(y)$, $\epsilon \sim N(0, \sigma^2 I_m)$, $y'=y+\epsilon$, $x \sim p_{X|Y'}(x|y'; \theta)$.

In various embodiments, the machine learning component 110 can employ one or more machine learning networks 114, such as VAEs and/or GANs, to identify causal relationships in the one or more mechanistic models 122 in the context of solving an SIP. For example, the machine learning component 110 employ a parameter space of the one or more mechanistic models 122 as a latent space of a distribution for sampling by the one or more machine learning networks 114. Thereby, the machine learning component 110 can construct a machine learning network 114 with a latent space or implicit distribution that is coherent with the parameter space of the mechanistic model 122 such that distributions of mechanistic model 122 parameters can be coherent with observation data regarding one or more biological systems characterized by the one or more mechanistic models 122.

Figure 2:
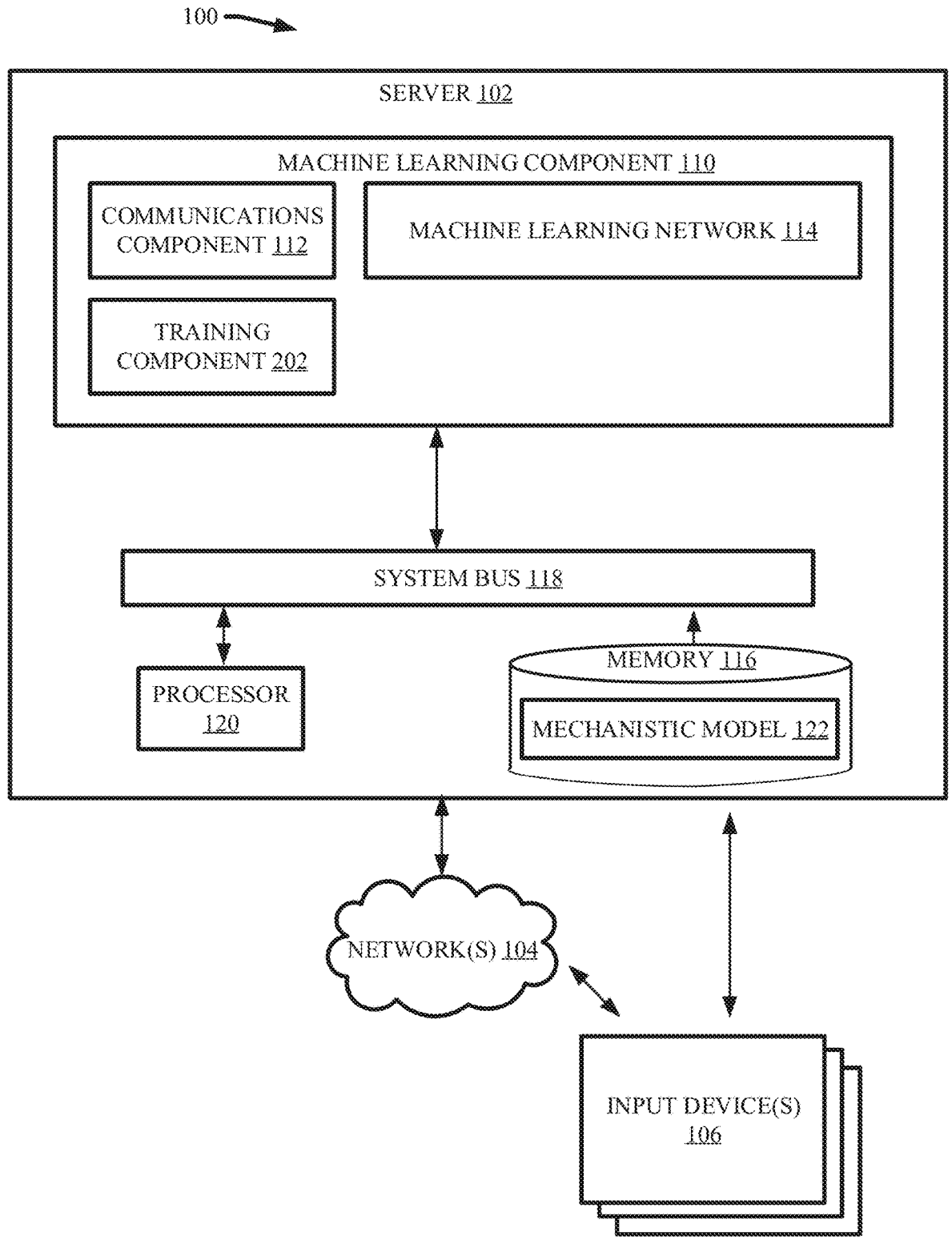
FIG. 2 illustrates a block diagram of an example, non-limiting system that can train one or more deep learning architectures to facilitate one or more parameter inferences regarding one or more mechanistic models in accordance with one or more embodiments described herein.

FIG. 2 illustrates a diagram of the example, non-limiting system 100 further comprising training component 202 in accordance with one or more embodiments described herein. Repetitive description of like elements employed in other embodiments described herein is omitted for the sake of brevity. In various embodiments, the training component 202 can train the one or more machine learning networks 114. For example, the training component 202 can train the one or more machine learning networks 114 by sampling the mechanistic model 122 outputs, given knowledge of a prior model parameter distribution, as training inputs to the machine learning network 114, where observation data can be omitted during training. In another example, the training component 202 can train the one or more machine learning networks 114 for representing the conditional probability of model parameters given one or more outputs of the mechanistic model 122, and/or a function of the mechanistic model 122. In one or more embodiments, the training component 202 can train one or more deep learning architectures (e.g., VAEs and/or GANs) of the machine learning networks 114, where the mechanistic model 122 outputs, given the prior model parameters, can be sampled as training inputs to the machine learning network 114.

Figure 3:
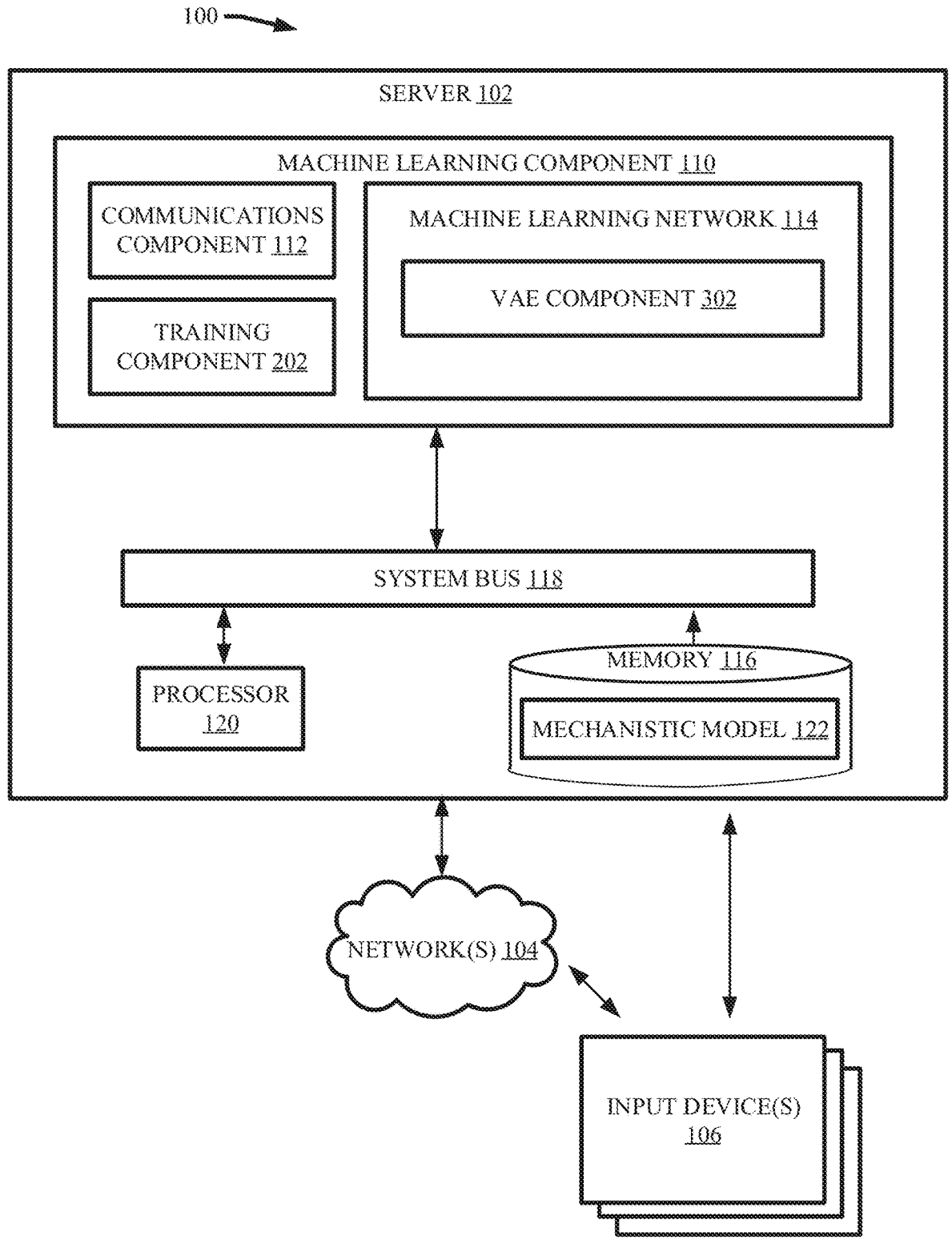
FIG. 3 illustrates a block diagram of an example, non-limiting system that can employ a variational autoencoder to render a latent space coherent with the parameter space of one or more mechanistic model in accordance with one or more embodiments described herein.

FIG. 3 illustrates a diagram of the example, non-limiting system 100 in which the machine learning network 114 comprises a VAE component 302 in accordance with one or more embodiments described herein. Repetitive description of like elements employed in other embodiments described herein is omitted for the sake of brevity. In various embodiments, the machine learning network 114 can be one or more VAEs, where the VAE component 302 can construct one or more VAEs to facilitate the determinations generated by the machine learning component 110. For example, the one or more VAEs generated and/or employed by the VAE component 302 can model conditional parameter distributions $p_{X|Y}(X|Y)$ (e.g., via one or more encoders) and $p_{Y|X}(Y'|X)$ (e.g., via one or more decoders). For instance, a Gaussian prior distribution of a latent space or learned distribution can be utilized. In various embodiments, the VAE component 302 can generate one or more VAE architectures (e.g., shown in FIGS. 4-6) that can approximate the conditional probability of parameters of the one or more mechanistic models 122 given observation data in the output space of the one or more mechanistic models 122. For instance, the VAE component 302 can employ the one or more example VAE architectures described herein to transform a base parameter distribution to a target parameter distribution via one or more autoregressive flows, where generation of a rotation of the coordinate system can be included in the structure of the autoregressive flows. In one or more embodiments, the VAE component 302 can include the one or more example VAE architectures described herein within one or more other deep learning networks to create a larger structure to infer latent variables from signals within different modalities and/or implement different categorization tasks, prediction networks, real time data transformations, a combination thereof, and/or the like.

Further, the one or more example VAE architectures (e.g., shown in FIGS. 4-6) generated and/or employed by the VAE component 302 can generate conditional probability via one or more bijector nodes that can perform one or more invertible transformations between two random variables with different distributions. In one or more embodiments, the one or more bijector nodes can be used to transform a base distribution (e.g., a Gaussian distribution $x^1 \sim N(0, I)$ to a desired distribution $x^n \sim X$, and the log of probability density can be calculated (e.g., via the VAE component 302) using Jacobian of the one or more transformations.

For example, the VAE component 302 can construct the one or more bijector nodes as one or more coupling layers and/or autoregressive transformations of the one or more VAE architectures. For instance, in coupling layer transformations, the vector $x \in \mathbb{R}^D$ can be split into two sets $x_1 \in \mathbb{R}^d$ and $x_2 \in \mathbb{R}^{D-d}$. Then the vector can be transformed with one or more invertible transformations $f_{\theta(x_1)}^k(x_2)$ in accordance with Equation 3 below.

$$x_1^{k+1/2} = x_1^k \qquad (3)$$
$$x_2^{k+1/2} = f_{\theta(x_1^k)}^k(x_2^k)$$

Where index k can equal 1, . . . , n, n can be the number of transformations, $\theta(x_1^k)$ can be parameters of the transformations that can be computed by the VAE component 302 with input $x_1^k$. In one or more embodiments, the transformations of Equation 3 can be chained with permutations or invertible convolutions between separate coupling layer transformations, and the non-integer index of k can be used to emphasize the existence of additional transformations. To represent log probability $p_{X|Y}(x|y)$, one or more example VAE architectures described herein can take y as an additional argument $$f_{\theta(x_1^k)}^k(x_2^k).$$

In one or more embodiments, the VAE component 302 can modify the one or more transformations $f_{\theta(x_1,y)}(x_2)$ by adding a regularization term r>0 and replacing the exponent by a softplus function in accordance with Equation 4.

$$f_{\theta(x_1,y)}(x_2) = [s(\theta_1(x_1,y)) + r1_{D-d}] \odot (x_2 - \theta_2(x_1,y)) \qquad (4)$$

The "$[s(\theta_1(x_1, y)) + r1_{D-d}]$" can be a scale component of Equation 4, and the "$\theta_2(x_1, y)$" can be a shift component of Equation 4. Where s can be the softplus function, and $\theta_1(x_1, y) = [\theta_1(x_1, y), \theta_2(x_1, y)]$. The regularization term can enable a stable numerical scheme with the softplus function instead of exponential and a chain of large number of invertible transformations.

In one or more embodiments, the VAE component 302 can introduce one or more rotations between the coupling layer transformations. For example, a rotation group can be based on a block diagonal matrix with 2×2 blocks. Each block can be composed of trainable weights and/or columns of the block were orthogonalized. The block diagonal matrix can be applied to the vector x for D/2 times, rolling the vector x between matrix-vector multiplications.

In one or more embodiments, the VAE component 302 can also augment one or more inputs for a density estimation model with a random noise. For example, a D-dimensional vector x can be added to one or more stochastic components extending the vector to D+1 or D+2 dimensions. Initially, the distributions of noise components and the rest of the components of x vector can be independent. However, components of the extended vector can become dependent after the first rotation transformation and start interacting in the one or more coupling layer transformations.

In various embodiment, the training component 202 can train one or more VAEs generated and/or employed by the VAE component 302 by sampling x from $p_X(X)$ using, for example, a Monte-Carlo method, here y can be generated from the mechanistic model 122 output and $\log p_\phi(x|y)$ can be maximized using, for example, a Stochastic Gradient Descent method. For instance, at least two scenarios of training can be envisaged. In a first scenario, the trained VAE can be intended for application in real-time, or near real-time, by sampling from a feed of data. Since initial training data can usually be produced by sampling from uniform $p_x(x)$, the model induced prior distribution in Y can, in general, be non-uniform. For example, an invertible deterministic model can produce high density near locations where Jacobian of the model can be zero. To alleviate bias induced by the model, the VAE can be retrained (e.g., in accordance with a Bayesian optimization). A statistical model trained with one or more prior distributions can be used to generate samples for uniform $p_y(y)$, which can be subsequently used to calculate y by the mechanistic model 122 and retrain the statistical model. In the second scenario, when accurate approximation is desired for one or more particular observation datasets, the actual $p_y(y)$ can be used for retraining the VAE iteratively.

For example, the one or more mechanistic models 122 can characterize one or more therapeutic compound interventions in a biological system, in which one or more parameters of the mechanistic model can be unaffected by the modeled therapeutic compound. For instance, only some components of the model vector of control parameter $x_c$ can change producing the vector $x_d$ for the therapeutic compound. Parameters $x_c$ and $x_d$ can generate two vectors $y_c$ and $y_d$, respectively. Populations of samples can be the same in both groups, and the process of sampling by, for example, a Monte-Carlo method from the prior distribution can involve two simulations for every sample keeping the same parameters that are not affected by the therapeutic compound. Additionally, a random variable z can be introduced with values z=0 (e.g., for absence of the therapeutic compound) and z=1 (e., for presence of the therapeutic compound). The loss function can be defined in accordance with Equation 5 below.

$$\mathcal{L}_\phi = \qquad (5)$$
$$= E_{\bar{x} \sim p(\bar{x})} E_{\bar{y} \sim p(\bar{y}|\bar{x})} [\log p_\phi(x = x_c | y = y_c, z = 0) +$$
$$+ \log p_\phi(x = x_d | y = y_d, z = 1)]$$

Where the vector $\bar{x}(\bar{y})$ can be the vector of all components for mechanistic model 122 input(output) without therapeutic compound extended by additional values of components modified by the therapeutic compound.

In various embodiments, the VAE component 302 can employ one or more example VAE architecture described herein to construct an accurate surrogate machine learning model for given observation data $p_Y(y)$. For instance, the encoder node can be used as an acquisition function in a Bayesian optimization problem with a goal to build the surrogate that generates the distribution $\alpha_x(x)$ and pair of (x,y') consistent to the mechanistic model 122. A random variable distribution can be factored in a product of conditionals, and one or more transformations can be built such that each $x_i$ conditioned on all previous dimensions x<i using an invertible transformation in accordance with Equation 6 below.

$$p_X(x) = p_{X_1}(x_1) \prod_{i=1}^{D} p_{X_i|X_{<i}}(x_i|x_{<i}) \tag{6}$$

Where multiple invertible transformations can be collected into the chain of invertible transformations.

In one or more embodiments, the VAE component 302 can augment the vector of input or output variables with additional stochastic components $Z \sim \mathcal{N}(0, I)$ modeling the joint distribution $p_{X,Z}(X, Z)$. For example, the VAE component 302 can employ general orthogonal transformations to improve the performance of an autoregressive network. A layer in the neural network with a matrix of model weights simulated orthogonal transformation can use orthogonalization of the matrix with QR decomposition.

Figure 4:
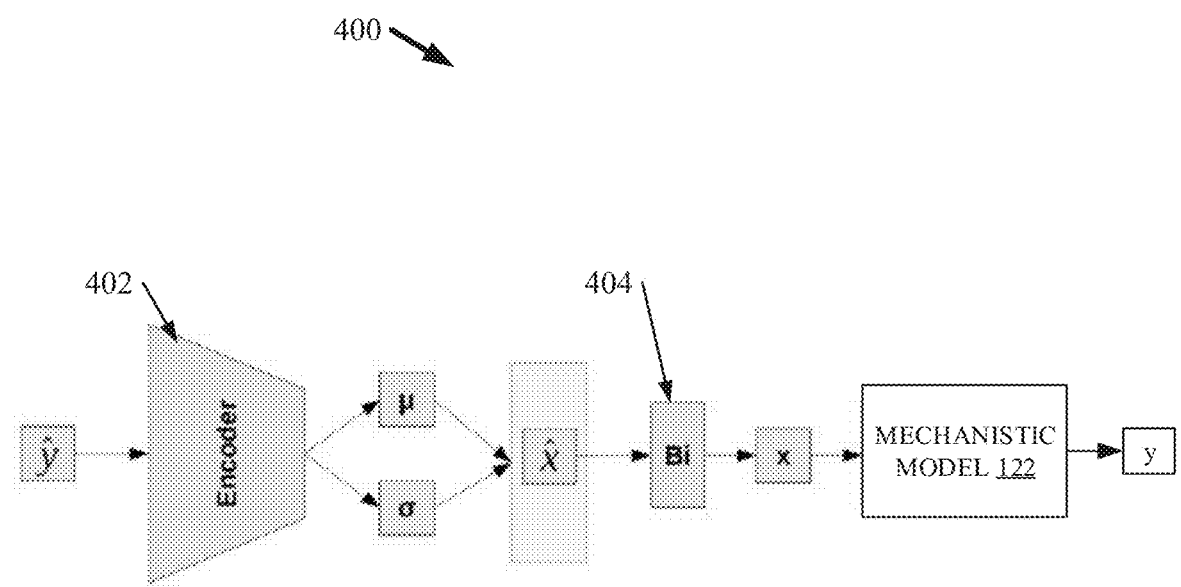
FIG. 4 illustrates a diagram of an example, non-limiting machine learning architecture that can be employed with one or more variational autoencoders to infer mechanistic causes of observed data in accordance with one or more embodiments described herein.
Figure 5:
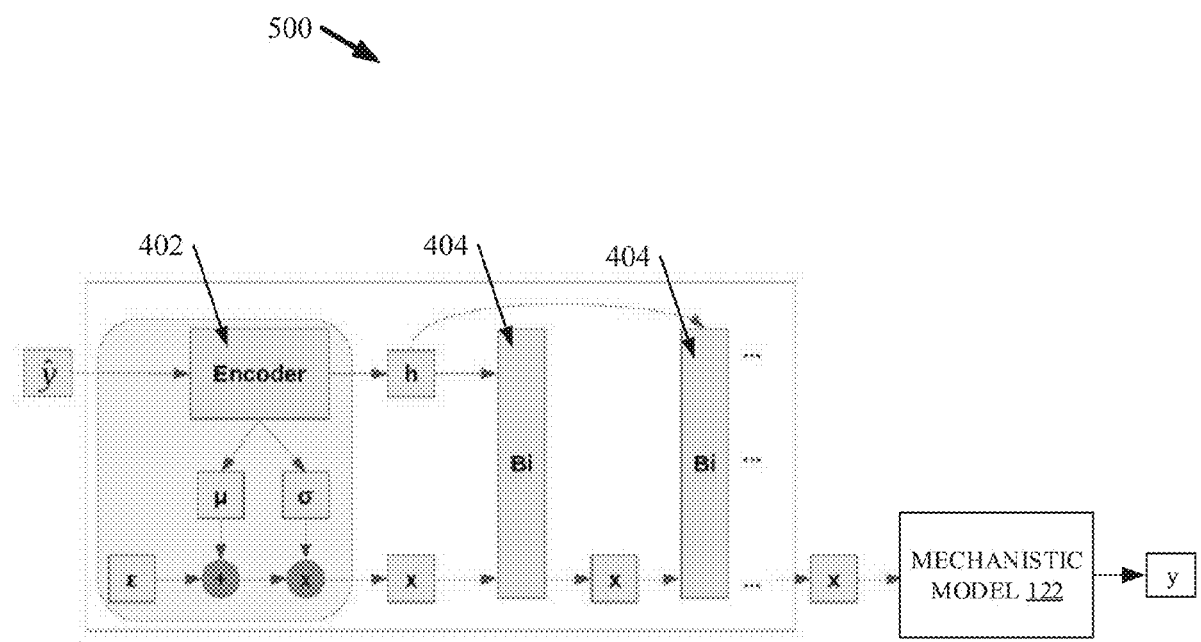
FIG. 5 illustrates a diagram of an example, non-limiting machine learning architecture that can employ an autoregressive flow algorithm with one or more variational autoencoders to infer mechanistic causes of observed data in accordance with one or more embodiments described herein.
Figure 6:
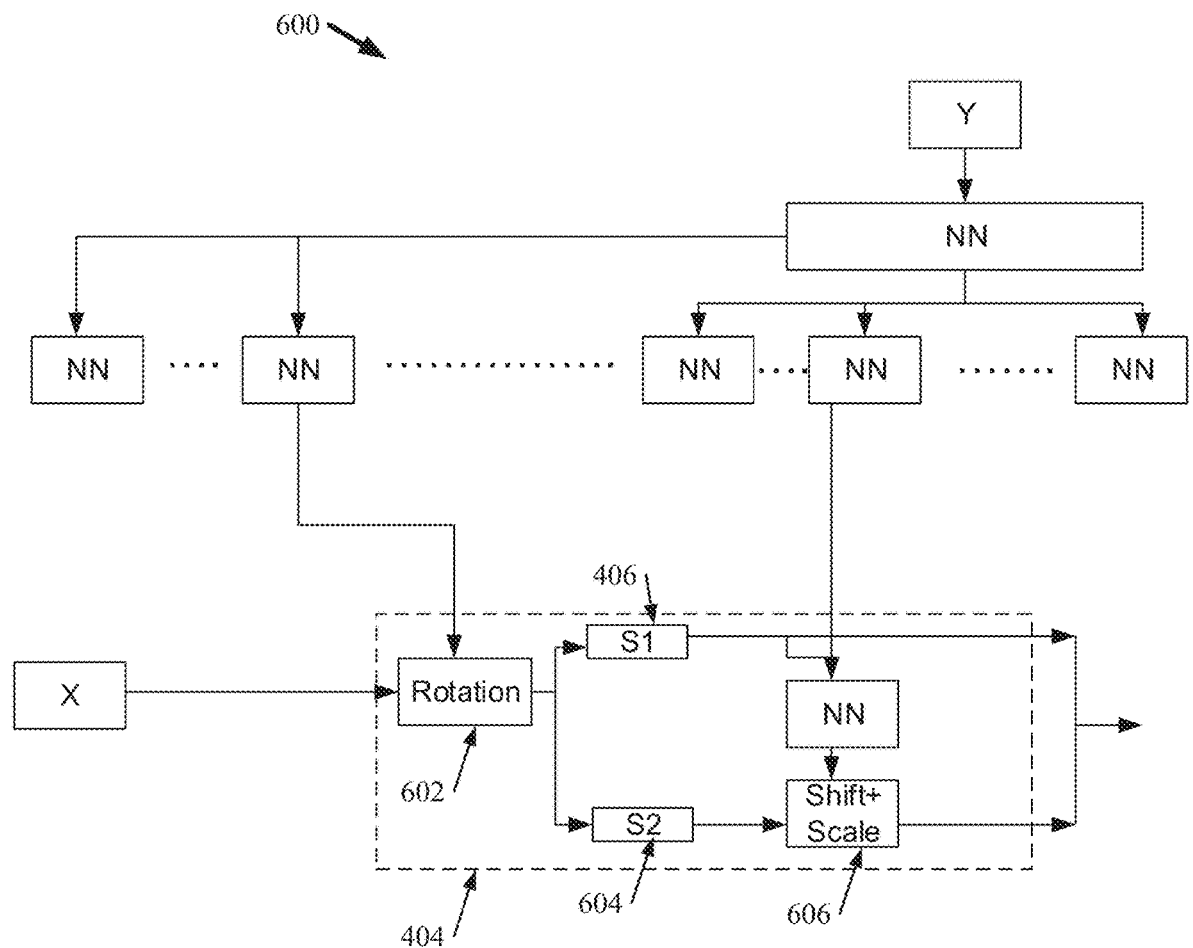
FIG. 6 illustrates a diagram of an example, non-limiting machine learning architecture that can be employed with one or more normalizing flows to infer mechanistic causes of observed data via maximizing log p(x) during raining in order to reproduce input parameters of a mechanistic model given outputs of the mechanistic model in accordance with one or more embodiments described herein.

FIGS. 4-6 illustrate example, non-limiting VAE architectures that can be generated and/or employed by the VAE component 302, where the latent space of the example VAE architectures can be coherent with the parameter space of one or more mechanistic models 122 in accordance with one or more embodiments described herein. Repetitive description of like elements employed in other embodiments described herein is omitted for the sake of brevity. For example, the example VAE architectures can include one or more encoder nodes 402 and/or bijector nodes 404. In one or more embodiments, the one or more mechanistic models 122 can be utilized as one or more decoder layers. In accordance with various embodiments described herein, "ŷ" can represent vector sampled from the real distribution of data features, "µ" can represent the mean of distribution, "σ" can represent the standard deviation of distribution, "x̂" can represent a latent vector, "x" can represent a sampled vector of mechanistic model parameters, and "y" can represent a model induced feature vector sampled from the distribution of model outputs.

For instance, FIG. 4 depicts a first example VAE architecture 400 that can include a bijector "Bi" that can transform a multi-variate Gaussian distribution to a prior distribution of model parameters employed by the one or more mechanistic model 122. FIG. 5 depicts a second example VAE architecture 500 that can extend the one or more encoder nodes 402 to comprise an inverse autoregressive flow architecture. For example, the autoregressive flow architecture can allow one or more transformations of the base distribution to a complex prior distribution of mechanistic model 122 parameters x accurately. In FIG. 5, "h" can represent a latent vector, and "E" can represent a random variable sampled from a Gaussian distribution.

FIG. 6 depicts a third example VAE architecture 600 that can employ the one or more mechanistic models 122 as the decoder node and a normalizing flow, where the latent space of the VAE can be known and desired to be the parameters of the mechanistic model 122. As shown in FIG. 6, the third example VAE architecture 600 can comprise a plurality of neural network layers "NN", where each neural network layer NN can implement the normalizing flow. Further, the third example VAE architecture 600 can include one or more bijector nodes 404 that can perform one or more transformations described herein. For instance, the bijector node 404 can include one or more rotation layers 602 that can perform one or more rotation transformations in accordance with the various embodiments described herein. Additionally, the bijector node 404 can incorporate one or more softplus functions 604, and/or shift/scale layers 606 in accordance with Equation 4. The training component 202 can train just the encoder distribution $p_{X|Y'}(x|y')$, by constructing a joint probability in accordance with Equation 7 below.

$$p_{X,Y'}(x,y') = p_{X|Y'}(x|y')p_{Y'}(y') \tag{7}$$

For example, the joint probability can be in the form of two deep learning networks, where the log likelihood of the network parameters can be maximized for samples from the prior parameter distribution and correspondingly generated from Y'.

Figure 7:
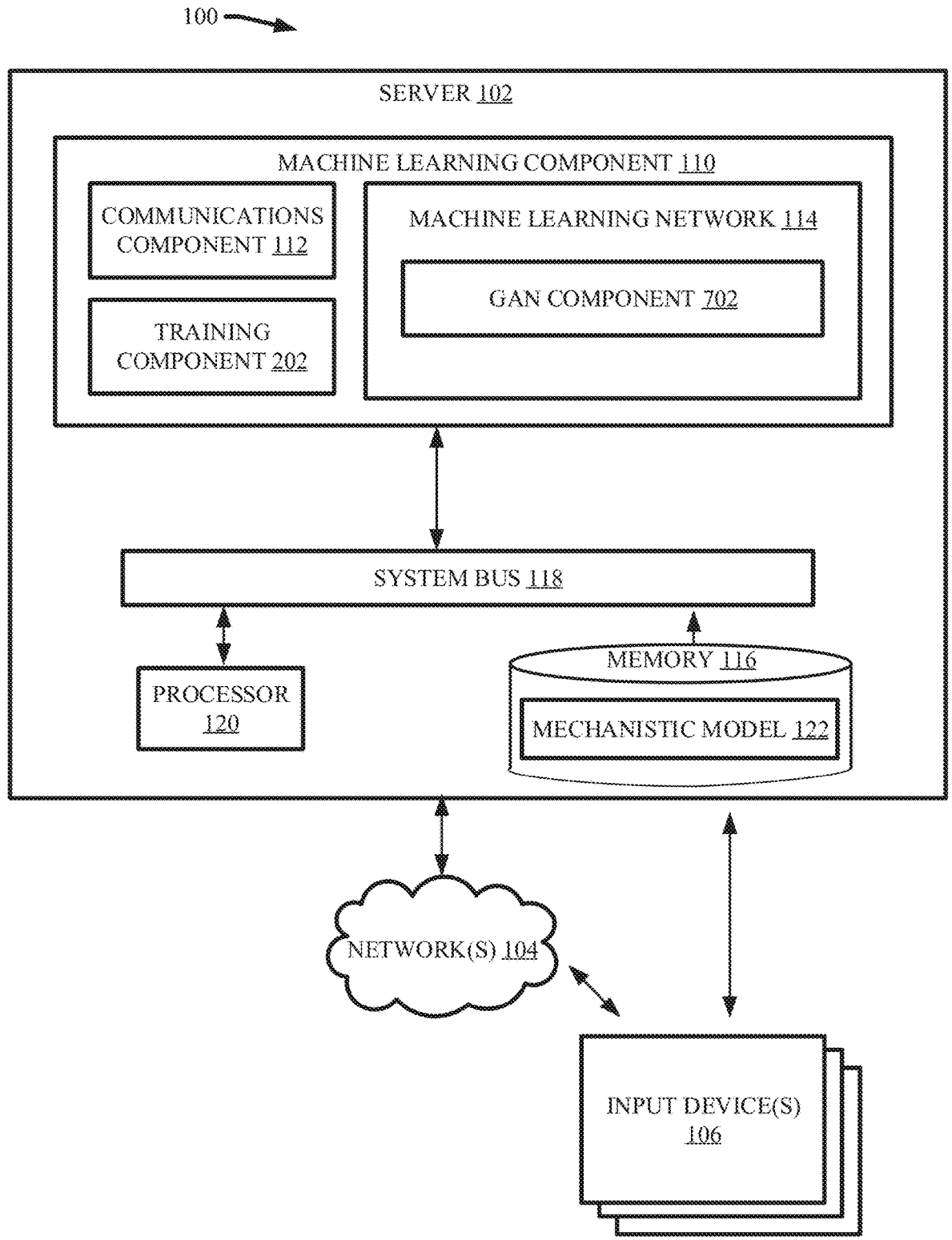
FIG. 7 illustrates a block diagram of an example, non-limiting system that can employ a generative adversarial network to render a learned distribution coherent with the parameter space of one or more mechanistic model in accordance with one or more embodiments described herein.

FIG. 7 illustrates a diagram of the example, non-limiting system 100 further comprising GAN component 702 in accordance with one or more embodiments described herein. Repetitive description of like elements employed in other embodiments described herein is omitted for sake of brevity. In various embodiments, the machine learning network 114 can be one or more GANs, where the GAN component 702 can construct one or more c-GANs and/or r-GANs to facilitate the determinations generated by the machine learning component 110.

Figure 8:
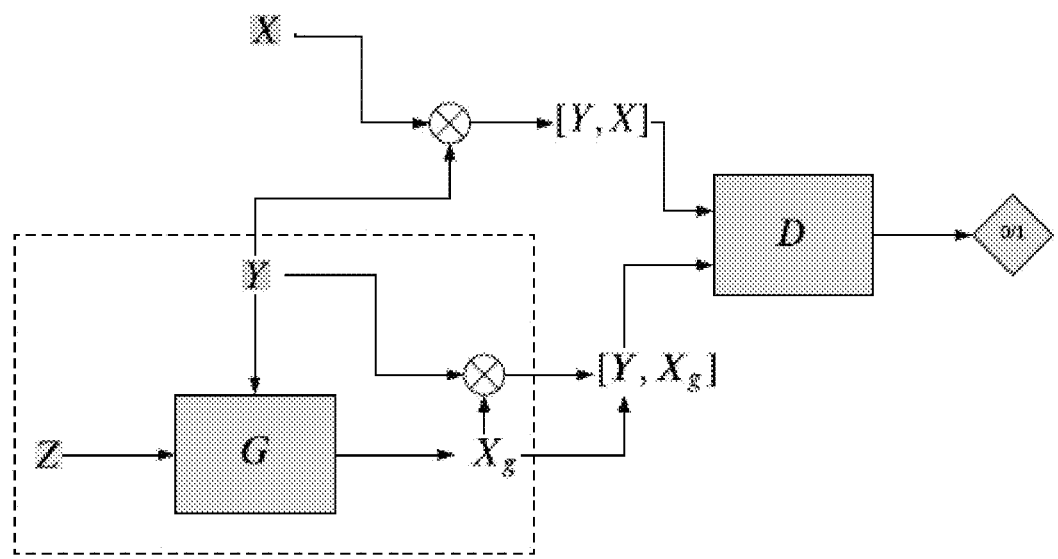
FIG. 8 illustrates a diagram of an example, non-limiting machine learning architecture that employ a conditional generative adversarial network to determine mechanistic causes of observed data based on one or more mechanistic models in accordance with one or more embodiments described herein.

In one or more embodiments, a c-GAN can be a simple and highly competitive alternative to normalizing flow networks used in simulation-based inference. For example, a c-GAN structure for a probabilistic model of $P_{X|Y}(x|y)$ is shown in FIG. 8. The c-GANs can define logical structures that are not necessarily based on probability measures such as probability density. Noise can be added to the output of the deterministic model to construct a conditional probabilistic model since the support of the likelihood density $P_{Y|X}(y|x)$ can be a low dimensional manifold defined by y=M(x), and the density is ill-defined. However, the GAN component 702 can construct a GAN generator that produces points in the low-dimensional manifold by reducing the dimensionality of the base random variable Z in the generator (e.g., as shown in FIG. 8). For the opposite effect, the GAN component 702 can use a higher dimensional Z to potentially increase entropy of the results produced by the generator, while the standard loss function for GAN discriminators remains valid.

In one or more embodiments, an r-GAN can use the prior distribution density $p_X(x)$ in Equation 1 as the relative likelihood of model input parameter values. Further, in one or more embodiments, the GAN component 702 can employ an r-GAN in a constrained-optimization problem to minimize the divergence between the prior $P_x$ and the distribution $Q_{X_g}$ produced by a generator in the GAN, with a generator network from some parametric family $G_\theta \in \{G_\theta(\bullet)|\theta \in \Theta\}$ enforcing that the density of model outputs is $q_Y(y)$. Thus, the constrained-optimization problem can be formulated in Equation 8, below.

$$\begin{aligned} &\text{given} \quad P_X, Q_Y, M \\ &\text{minimize} \quad D(P_X \| Q_{Y_g}) \\ &\text{subject to} \quad supp(X_g) \subseteq supp(X), D(Q_Y \| Q_{Y_g}) = 0 \\ &\text{where} \quad y_g = M(x_g) \sim Q_{Y_g}, x_g \sim Q_{X_g} \end{aligned} \tag{8}$$

In Equation 8, $D(\cdot\|\cdot)$ is an f-divergence measure such as Jensen-Shannon ("JS") divergence. To solve the constrained-optimization problem with GAN, the GAN component 702 can minimize the divergence $D(P_X\|Q_{X_g})$ over $\theta$ in the generator: $z \sim P_Z$, $x_g = G_\theta(z) \sim Q_{X_g}$, where $P_Z$ is a base distribution (e.g., Gaussian). This reformulation of the problem provides another way to account for the prior parameter distribution and maintain high entropy among samples. Thereby, the machine learning component 110 can identify not just any distribution of model input parameters that produces $Q_Y$, but the distribution with the minimal divergence from the prior parameter distribution. The additional constraint $\mathrm{supp}(X_g) \subseteq \mathrm{supp}(X)$ can ensure that the distribution of the generated input parameters $X_g$ is within the prior bounds. Further, the r-GAN can have two discriminators, and the generator loss can be composed of a weighted sum of losses due to both discriminators. The constraint $D(Q_Y\|Q_{Y_g})$ can be enforced by minimizing the distance between the distributions in the penalty-like method in r-GAN, where the weight for generator loss due to discriminator $D_X$ can be smaller than the weight due to $D_Y$. Different f-divergence measures could be applied using different GAN loss functions. Thereby, minimization of $D(P_X\|Q_{X_g})$ could be viewed as a regularization that increases the entropy of generated model input parameters, thus alleviating a common deficiency of standard GANs.

In various embodiments, the machine learning component 110 can employ one or more r-GANs constructed by the GAN component 702 to infer model input parameters for the one or more mechanistic models 122 with regards to two sets of observation data. For example, samples of model input parameters for a control population of the observation data and a treatment population of the observation data can be denoted by $x_c \sim Q_{X_c}$, $x_d \sim Q_{X_d}$. The machine learning component 110 can evaluate distributions of $Q_{X_c}$ and $Q_{X_d}$ given distributions of observation data $Q_{Y_c}$ and $Q_{Y_d}$ for the control and treatment populations. Further, the machine learning component 110 can define a joint probability distribution between $X_c$ and $X_d$ with marginals $Q_{X_c}$ and $Q_{X_d}$.

For example, the machine learning component 110 can assume a joint distribution on model input parameters for two populations of observation data that factorizes into the product $q_{X_c,X_d}(x_c, x_d) = q_{X_c}(x_c) q_{X_d}(x_d)$. The factorization can result in a corresponding factorization of the observation data densities. Thereby, the machine learning component 110 can solve the SIP by a method for a single population of observation data. Variables $X_c$ and $X_d$, as well as $Y_c$ and $Y_d$, can be independent and the SIP can be solved independently for each population of observation data.

In a further example, the factorization of the join probability density can be extended. For instance, the machine learning component 110 can split input parameter vectors into components $x_s$ that can be unaffected by shared parameters and components $\overline{x}_c, \overline{x}_d$ forming vectors of input parameters $x_c = [x_s, \overline{x}_c]$, $x_d = [x_s, \overline{x}_d]$ for control and treatment groups, respectively. The split can result in the factorization $q_{X_c,X_d|X_s}(\overline{x}_c, \overline{x}_d|x_s) = q_{X_c|X_s}(\overline{x}_c|x_s) q_{X_d|X_s}(\overline{x}_d|x_s)$. Additionally, extension of the r-GAN can be performed in accordance with Equation 9, below.

$$\text{given} \quad P_{X_c}, P_{X_d}, Q_{Y_c}, Q_{Y_d}, M \tag{9}$$

minimize $$\theta_1, \theta_2, \theta_3 \quad D(P_{X_c}\|Q_{X_{g,c}}) + D(P_{X_d}\|Q_{X_{g,d}})$$

-continued $$\text{subject to} \quad \mathrm{supp}(X_{g,c}) \subseteq \mathrm{supp}(X_c), \mathrm{supp}(X_{g,d}) \subseteq \mathrm{supp}(X_d),$$

$$D(Q_{Y_c}\|Q_{Y_{g,c}}) = 0, D(Q_{Y_d}\|Q_{Y_{g,d}}) = 0$$

where $[z_s, z_c, z_d] \sim P_Z$, $x_s = G_{\theta_1}(z_s), \overline{x}_c = G_{\theta_2}(z_c, x_s), \overline{x}_d = G_{\theta_3}(z_d, x_s),$ $x_c = [x_s, \overline{x}_c], x_d = [x_s, \overline{x}_d],$ $x_c \sim Q_{X_{g,c}}, x_d \sim Q_{X_{g,d}},$ $M(x_c) \sim Q_{Y_{g,c}}, M(x_d) \sim Q_{Y_{g,d}}$ In various embodiments, the flexibility of the GAN structures that can correspond to different information on the joint distribution is markedly flexible.

As an example of the flexibility provided by the GAN structures, one or more embodiments described herein simulate a deterministic map $x_d = T(x_c)$ that is either unknown and must be learned, or is known explicitly. For instance, one or more embodiments of the GAN structures described herein can be employed where the effect of the perturbation is known. For example, a therapeutic with known effects on a particular channel conductance may be employed to test the response of a biological cell in a given experiment characterized by the one or more mechanistic models 122. A suitable GAN structure 1000 to solve the intervention SIP can then be defined in accordance with Equation 10, below.

$$\text{given} \quad P_{X_c}, Q_{Y_c}, Q_{Y_d}, M \tag{10}$$

minimize $$\theta \quad D(P_{X_c}\|Q_{X_{g,c}})$$

$$\text{subject to} \quad \mathrm{supp}(X_{g,c}) \subseteq \mathrm{supp}(X_c),$$

$$D(Q_{Y_c}\|Q_{Y_{g,c}}) = 0, \ D(Q_{Y_d}\|Q_{Y_{g,d}}) = 0$$

where $z \sim P_Z, x_c = G_\theta(z)$ $x_c \sim Q_{X_{g,c}}, x_d \sim T(x_c),$ $M(x_c) \sim Q_{Y_{g,c}}, M(x_d) \sim Q_{Y_{g,d}}$ Further, to demonstrate the efficacy of one or more GAN structures generated by the GAN component 702, a comparison can be made regarding the performance of at least Markov chain Monte Carlo ("MCMC"), c-GAN, and/or r-GAN in one or more examples with a single population of observation data, and then test one or more extensions of an r-GAN (e.g., a t-GAN) in the intervention example with one or more shared input parameters across two populations of observation data. Additionally, one or more t-GAN structures described herein can be tested in the same intervention example with an assumption that the deterministic map is unknown and must be learned.

For instance, the one or more mechanistic models 122 can be represented by Equation 11, with two input parameters.

$$M(x) = (a - x_1)^2 + b(x_2 - x_1^2)^2 \tag{11}$$

where $a=1$ and $b=100$. Further a prior parameter distribution $P_X$ can be utilized to test input parameters, taken as uniformly distributed in the range $[0,2] \times [0,2]$ such as $x_1 \sim \mathcal{U}(0,2)$ and $x_2 \sim \mathcal{U}(0,2)$. MCM, c-GAN, and/or r-GAN can be tested on the synthetic distribution of observation $Q_Y$, a Guassian distribution with parameters $\mu = 250$, $\sigma = 50$ truncated to the interval $(0, 1000)$.

To generate observation data from the intervention study, input parameters were sampled from the one or more mechanistic models 122 (e.g., functions of the mechanistic models 122) for the same Gaussian distribution $Q_Y$ by training (e.g., via training component 202) one or more c-GAN structures and sampling the corresponding input parameters. These samples can be used as $x_c$, and a linear transformation $x_d = A x_c$ can be applied with diagonal matrix A with entries along, for example, the diagonal 1.0 and 0.6. In various embodiments described herein, the model characterized by Equation 11 can be applied to samples $x_c$ and $x_d$ to obtain $Q_{Y_c}$ and $Q_{Y_d}$ for use in an intervention problem to demonstrate the efficacy of one or more features of the system 100.

To mimic the complexity of biophysical mechanistic models 122, a Rosenbrock function with multidimensional inputs can also be considered by the machine learning component 110 in accordance with Equation 12 below.

$$f(x) = \sum_{i=1}^{N-1} \left[ b(x_{i+1} - x_i^2)^2 + (a - x_i)^2 \right] \qquad (12)$$

In Equation 12 above, a=1, b=100, and the dimension N can be set to 8. To generate function of the mechanistic model 122 M with a vector of outputs y rather than a scalar, 5 randomly chosen permutations of the coordinates $\{x_i\}$ can be performed in Equation 6, yielding the 5-dimensional output vector (e.g., the dimensions of X and Y can be 8 and 5, respectively) in accordance with Equation 13.

$$M(x) = [f(x^1), f(x^2), \ldots, f(x^5)] \qquad (13)$$

Where $x^i$ can be the vector x after permutations. Similar to the Rosenbrock function of two input parameters, the machine learning component 110 can consider a uniformly distributed prior parameter distribution for the high dimensional model, $x_i \sim \mathcal{U}(0,2)$.

Figure 9:
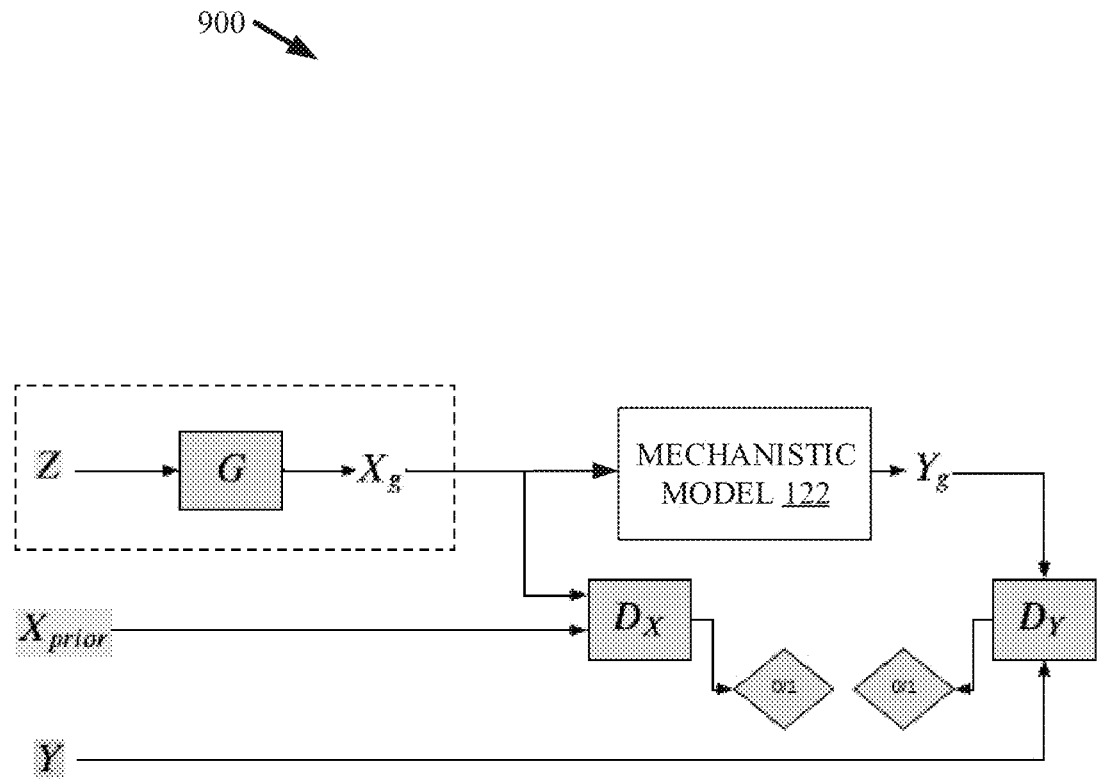
FIG. 9 illustrates a diagram of an example, non-limiting machine learning architecture that employ a regularized generative adversarial network to determine mechanistic causes of observed data based on one or more mechanistic models in accordance with one or more embodiments described herein.

FIGS. 8-9 illustrate diagrams of example, non-limiting GAN structures that can be generated and/or employed by the GAN component 702 in accordance with one or more embodiments described herein. Repetitive description of like elements employed in other embodiments described herein is omitted for sake of brevity. In various embodiments, FIGS. 8-9 can illustrate GAN models generated and/or employed by the GAN component 702 for inference of mechanistic model 122 parameters by the machine learning component 110. For example, the GANs generated and/or employed by the GAN component 702 can be represented as graphs with one or more generator nodes G and/or discriminator nodes D (e.g., as shown in FIGS. 8-9).

FIG. 8 illustrates an example c-GAN 800 that can be generated and/or employed by the GAN component 702. As shown in FIG. 8, the example c-GAN 800 can include a generator node G that can convert a random variable Z of a given base parameter distribution (e.g., a Gaussian distribution) to a variable $X_g$ given an input variable Y. Further, a discriminator node D can be trained (e.g., via training component 202) to distinguish sample data X from the converted variable $X_g$. Further, the input to the discriminator D can be augmented with the input variable Y. The dashed box in FIG. 8 can denote a sub graph with the generator G, which can be used for inference of input parameters after training.

As shown in FIG. 8, the example c-GAN 800 can include a single discriminator node D, where inputs to the discriminator node D and the generator node G can be augmented by values of the input variable Y. Where the function of two input parameters is employed, the dimension of the normal random variable Z fed to the generator node G can be set to 1 in order to generate x in a low-dimensional manifold. In the one or more high dimensional model embodiments described herein, the dimension of Z can be same as for X.

FIG. 9 illustrates an example r-GAN 900 that can be generated and/or employed by the GAN component 702. As shown in FIG. 9, the example r-GAN 900 can also include the generator node G along with multiple discriminator nodes $D_X$ and $D_Y$. In various embodiments, the example r-GAN 900 can solve one or more constrained-optimization problems described herein using a penalty method. For instance, the loss of the generator node G can be the weighted sum of loss due to the two discriminator nodes $D_X$ and $D_Y$. As shown in FIG. 9, "$X_{prior}$" can denote a prior parameter distribution, and "$Y_g$" can denote the model output given the generated sample $x_g$ from the parameter distribution produced by the generator node G. In various embodiments, the example r-GAN 900 can enforce the equality of $Q_Y$ and $Q_{Y_g}$ and/or maximize an overlap between $P_X$ and $Q_{X_g}$. The dashed box in FIG. 9 can denote a sub graph with the generator G, which can be used for inference of input parameters after training.

In various embodiments, the standard loss for the discriminator nodes of the various GANs described herein can be maximized in accordance with Equation 14, below.

$$L_D(D,G) = \mathbb{E}_{x \sim P_R} \log[D(x)] + \mathbb{E}_{z \sim P_z} \log[1 - D(G(z))] \qquad (14)$$

Where "D" can represent one or more of the discriminator nodes, "G" can represent the generator node, "$P_R$" can be the target parameter distribution for the given node of the GAN. For generators G, a modification of the non-saturating loss can be utilized in accordance with Equation 15 below.

$$L_G(D,G) = \mathbb{E}_{z \sim P_z} \log[D(G(z))] - \mathbb{E}_{z \sim P_z} \log[1 - D(G(z))] \qquad (15)$$

Thereby, the total loss for a given generator node G of one or more of the GANs can be a sum of losses due to the one or more discriminators D in accordance with Equation 16 below.

$$L_{Gt}(D_1, \ldots, D_n, G) = \sum_{i=1}^{n} w_i \times L_G(D_i, G) \qquad (16)$$

As shown in FIG. 9, the example r-GAN 900 can include multiple discriminator nodes D (e.g., $D_X$ and $D_Y$). To enforce the constraint of a constraint-optimization problem, the penalty can be set through different weights for each of the generator node G loss functions due to the multiple discriminators in Equation 16. In various embodiments, the example r-GAN 900 can be trained in two stages. For example, the part of the example r-GAN 900 that produces $X_g$ (e.g., or $X_{c,g}$, $X_{d,g}$), including discriminator nodes D for prior parameter distributions, can be denoted as $GAN_X$. During a first stage of the training, the $GAN_X$ can be trained separately on the prior parameter distribution and saved as network weights. During a second stage of training, one or more r-GAN variations (e.g., t-GANs) can be trained on the given $Q_Y$ with initialization of $GAN_X$ from the trained networks of the first stage of training. The weights $w_i$ of the loss function of Equation 16 can be taken as 0.1 and 1 for the discriminator nodes $D_X$ and $D_Y$.

Figure 10:
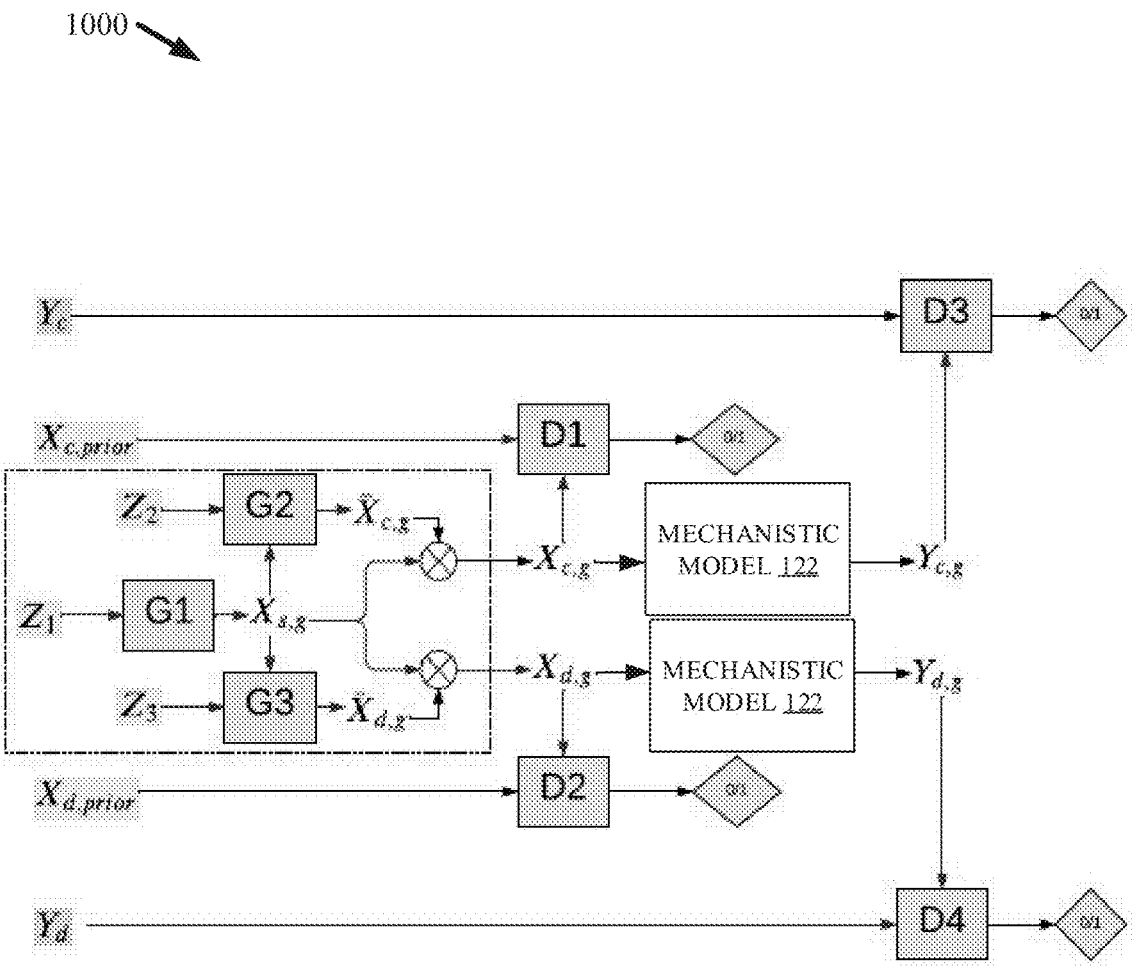
FIG. 10 illustrates a diagram of an example, non-limiting machine learning architecture that employ a transport generative adversarial network to determine mechanistic causes of observed data based on one or more mechanistic models in accordance with one or more embodiments described herein.
Figure 11:
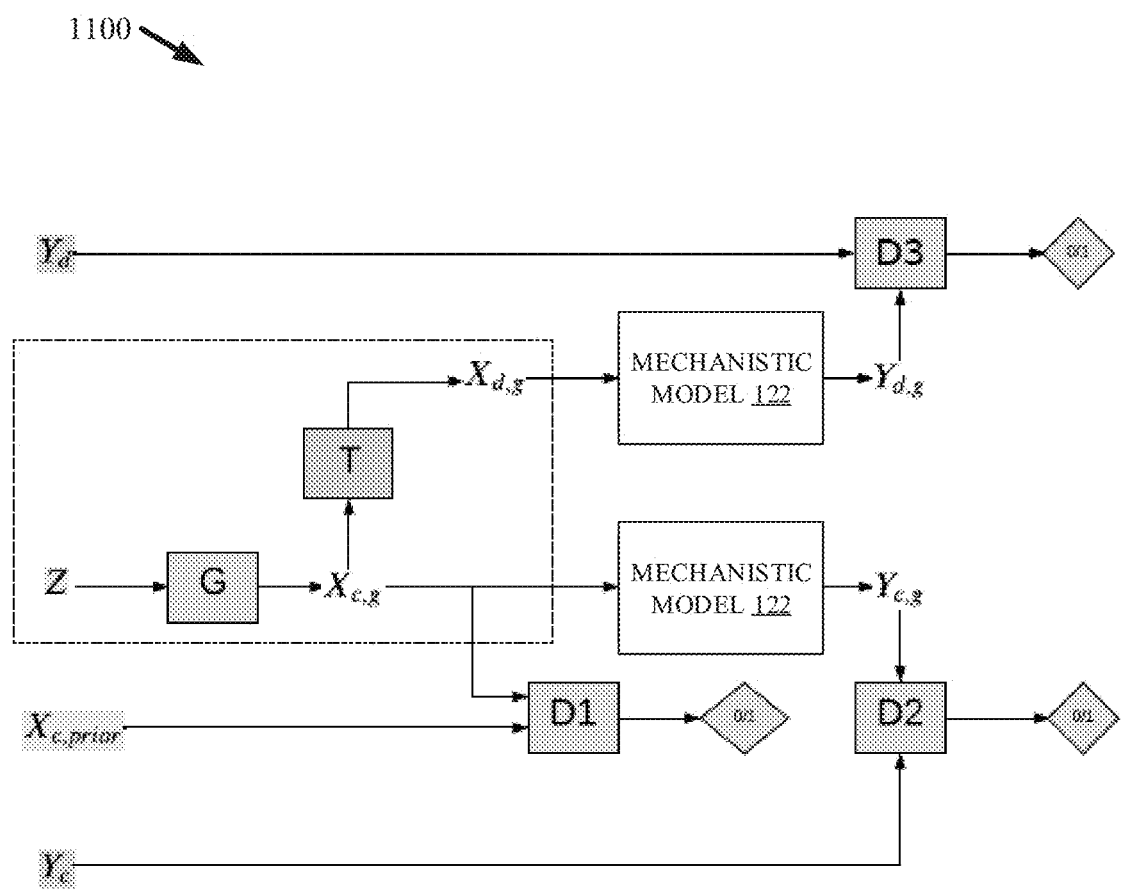
FIG. 11 illustrates a diagram of an example, non-limiting machine learning architecture that employ a transport generative adversarial network to determine mechanistic causes of observed data based on one or more mechanistic models in accordance with one or more embodiments described herein.

FIG. 10-11 illustrate example, non-limiting t-GAN structures that can be generated and/or employed by the GAN component 702 in accordance with one or more embodiments described herein. Repetitive description of like elements employed in other embodiments described herein is omitted for sake of brevity. In various embodiments, FIGS. 10-11 can illustrate GAN models that extend the features of the example r-GAN 900.

As shown in FIG. 10, a first example t-GAN 1000 can include multiple generator nodes G (e.g., a first generator node G1, a second generator node G2, and/or a third generator node G3), and/or multiple discriminator nodes D (e.g., a first discriminator node D1, a second discriminator node D2, a third discriminator node D3, and/or a fourth discriminator node D4). In various embodiments, the first example t-GAN 1000 can be employed to analyze multiple mechanistic models 122. For example, a first example t-GAN 1000 can be generated and/or employed by the GAN component 702 to simulate intervention with the shared parameters $x_s$, which can be unaffected by intervention, and with independence of other input parameters. In various embodiments, the joint distribution can be enforced in the links between multiple generator nodes G. Dimensions of $Z_i$ variables independently generated from the base distributions can be 1.

As shown in FIG. 11, a second example t-GAN 1100 can include a single generator node G in conjunction with known deterministic map T and multiple deterministic nodes D (e.g., first deterministic node D1, second deterministic node D2, and/or third deterministic node D3). The dashed lines in FIGS. 10-11 can denote a sub graph with generator components (e.g., multiple generator nodes G and/or deterministic maps T) used for input parameter inference after training. In one or more embodiments, the generator nodes G can comprise generator networks, and the discriminator nodes D can comprise discriminator networks.

In various embodiments, the efficacy of the example GANs described herein can be demonstrated by employing the one or more GANs with the numerical scheme of Unrolled GAN with 4 to 8 iterations of the unrolled Adam method with a step size of 0.0005. The step of the Adam optimizer for the generator node G can be 0.0001, and the step of the Adam optimizer for the one or more discriminator nodes D can be 0.00002. Further, the $\beta_1$ and $\beta_2$ parameters of the Adam optimizer can be set to default values of 0.9 and 0.999, respectively. The mini-batch size can be 100, and the training sets can consist of 10,000 samples. Further, a feedforward neural network can be employed with 8 hidden layers and 180 nodes per layer, with the rectified linear unit ("ReLU") activation function for the generator node G and/or one or more discriminator nodes D. Additionally, the number of epochs can be 200, and trained parameters (e.g., weights of the generator node G) can be saved every 10 iterations. The trained parameters can be used to compare the parameter distributions produced by the generator node G and the prior parameter distribution $P_X$, given synthetic observation data. The divergence between distributions can be tested with JS-divergence calculated using a Gaussian mixture model of 100 components. In various embodiments, the inputs to the discriminator nodes D of example c-GAN 800 and/or example r-GAN 900 can be passed through linear normalization transformations (e.g., centering, scaling, principal component analysis ("PCA"), and/or the like) trained on the target distributions, where forward and inverse log-transformations can be used to ensure that input parameters are within the prior bounds.

To further demonstrate the efficacy of one or more GANs (e.g., c-GANS and/or r-GANS) generated and/or employed by the GAN component 702, performance of the GANs (e.g., example c-GAN 800, example r-GAN 900, first example t-GAN 1000, and/or second example t-GAN 1100) can be compared to one or more MCMC methods that leverage tensor calculations and run with one or more libraries like TensorFlow. To achieve the MCMC performance data described herein, in a first step of the MCMC algorithm, a no u-turn sampler (e.g., an adaptive variant of Hamiltonian Monte Carlo implemented in the TensorFlow probability library) can be used to generate the initial set of points. In a second step, a distribution of generated points can be approximated with a Gaussian mixture. Further, rejection sampling can be performed as a subsequent refinement step to obtain final sample data.

FIGS. 12-15 illustrates diagrams of example, non-limiting graphs that can demonstrate the efficacy of the machine learning component 110 employing one or more GANs in accordance with one or more embodiments described herein. Repetitive description of like elements employed in other embodiments described herein is omitted for sake of brevity. For example, FIG. 12 can depict graphs 1202, 1204 that can show the surface and/or contour plots of a Rosenbrock test function of two input parameters over the selected prior parameter distribution range ($x_1 \sim \mathcal{U}(0,2)$ and ($x_2 \sim \mathcal{U}(0,2)$). Graph 1202 can depict a three-dimensional surface plot of the test function, and graph 1204 can depict a contour plot of the test function.

The MCMC, example c-GAN 800 and example r-GAN 900 described herein can be employed to infer the distribution of input parameters of the test function. For example, the machine learning component 110 can employ the example c-GAN 800 and/or the example r-GAN 900 to infer the joint distribution of parameters $x_1$ and $x_2$, which, when forwarded through the mechanistic model 122, results in a function output distribution that matches the target distribution. For a normal distribution of observation data (e.g., a target output distribution) $Q_Y$, high density regions can align with the contour lines of the contour plot of graph 1204. For instance, for $Q_Y$ with a mean of 250, data points can be concentrated along contour lines in the left top corner of graph 1204 and the right bottom corner of graph 1204.

Figure 12:
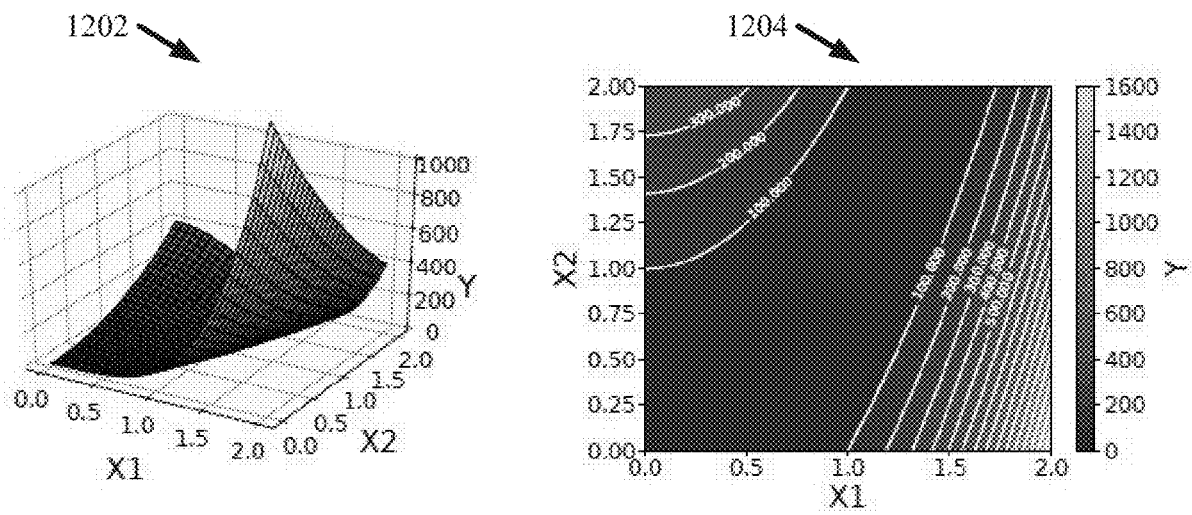
FIG. 12 illustrates diagrams of an example, non-limiting Rosenbrock test function to demonstrate the efficacy of employing a generative adversarial network to determine mechanistic causes of observed data in accordance with one or more embodiments described herein.
Figure 13:
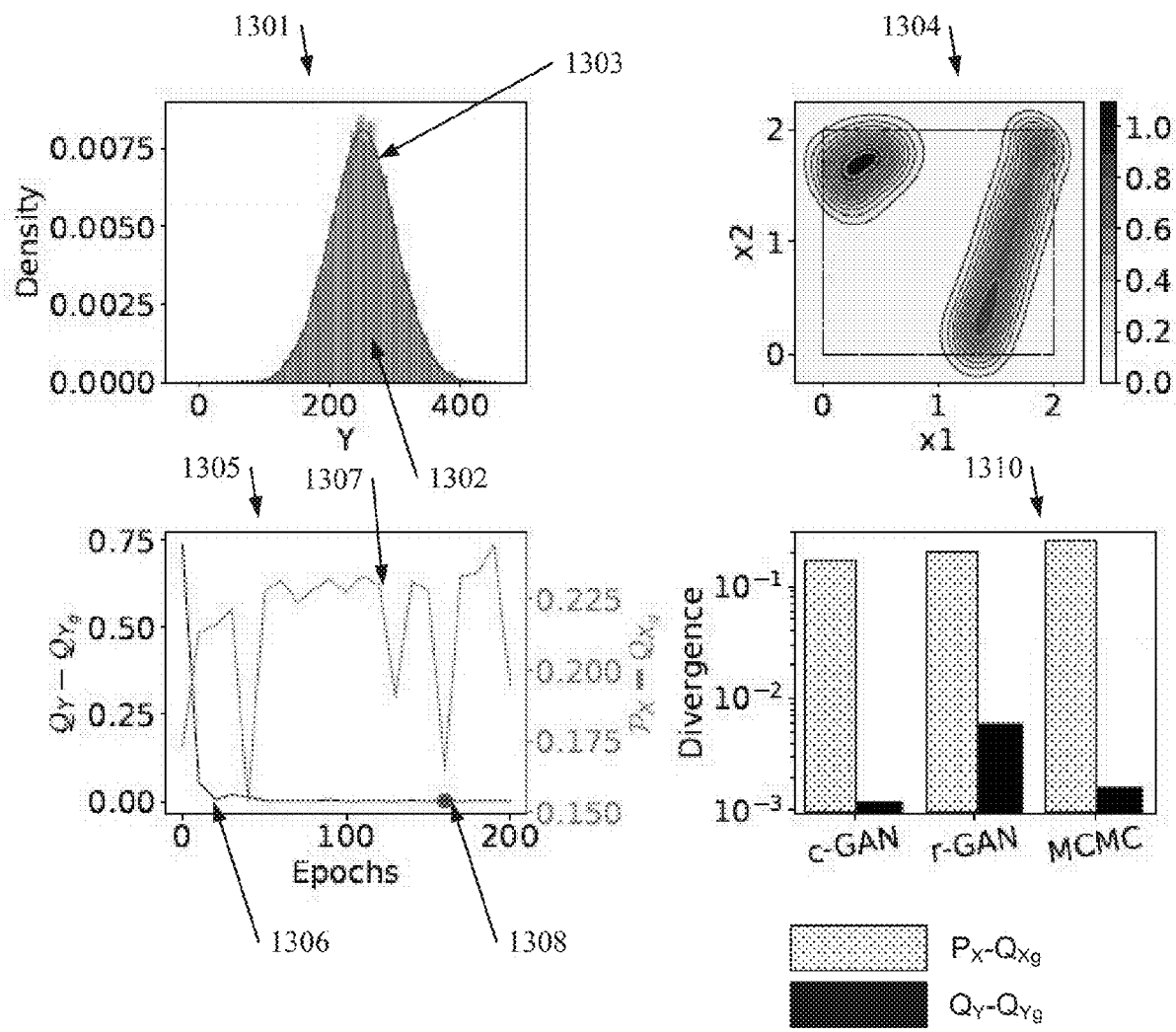
FIG. 13 illustrates a diagram of example, non-limiting graphs regarding model parameter distributions to demonstrate the efficacy of employing a generative adversarial network to determine mechanistic causes of observed data in accordance with one or more embodiments described herein.

The example characterized by FIG. 12, the desired target output distribution $Q_Y$ can be set as a distribution with mean $\mu=250$ and standard deviation of $\sigma=50$. Graph 1301 of FIG. 13 can show the desired target distribution $Q_Y$ via area 1302. Graph 1304 can show the joint distribution of parameters $x_1$ and $x_2$ that can be obtained using the example c-GAN 800. The dashed rectangle in graph 1304 can denote the bounds set by the prior distribution $P_X$. Forwarding through the given mechanistic model 122, the inferred input parameter samples can result in the mechanistic model 122 output distribution shown by $Q_{Y_g}$ via line 1303 in graph 1301. Thereby, graph 1301 can show kernel density estimation ("KDE") of the desired target output distribution $Q_Y$ (e.g., via area 1302) and the generated (e.g., inferred) output distribution $Q_{Y_g}$ (e.g., via line 1303) using example c-GAN 800. As shown in graph 1301, the generated output distribution can match the desired target distribution.

To quantify the performance of the MCMC, example c-GAN 800, and/or example r-GAN 900, the proximity of the generated output distribution $Q_{Y_g}$ to the target output distribution $Q_Y$ can be determined along with the closeness of the generated distribution of input parameters $Q_{X_g}$ to the prior parameter distribution $P_X$ via JS-divergence. Graph 1305 can show the plot of JS-divergence for both $Q_{Y_g}$ and $Q_{X_g}$ as a function of the training epoch number for the example c-GAN 800. Line 1306 can quantify the divergence between the target output distribution $Q_Y$ and the inferred output distribution $Q_{Y_g}$. Line 1307 can quantify the closeness of the generated (e.g., inferred) distribution of input parameters $Q_{X_g}$ to the prior distribution $P_X$. The epoch number used to select the final weights of the example c-GAN 800 for sampling can be denoted by dot 1308. Further, graph 1310 compares the performance of employing MCMC, example c-GAN 800, and example r-GAN 900. For example, graph 1310 can depict a bar-plot of JS-divergence estimated to compare the performance of MCMC, example c-GAN 800, and example r-GAN 900.

Further, the MCMC, example c-GAN 800, and example r-GAN 900 can be applied to infer the distribution of input parameters of the high dimensional Rosenbrock function of Equation 12 with multidimensional outputs in accordance with Equation 13. For instance, FIG. 13 regards inference of the distribution of input parameters for the Rosenbrock function of 2 variables (e.g., mechanistic model 122 input parameters) for $Q_Y = \mathcal{N}(250, 50^2)$ by MCMC, example c-GAN 800, and example r-GAN 900. For example, the desired target output distribution $Q_Y$ can be set as a multivariate normal distribution with means $\mu_i = 250$, $i=1,2,\ldots$, 5 and diagonal covariance matrix with standard deviation of each individual features $\sigma_{Y_i} = 50$, $i=1, 2, \ldots, 5$. The performance of the example c-GAN 800, example r-GAN 900, and MCMC was evaluated similarly to the example with the function of two variables by quantifying the proximity of the generated output distribution $Q_{Y_g}$ the prior distribution $P_X$ via JS-divergence.

Figure 14:
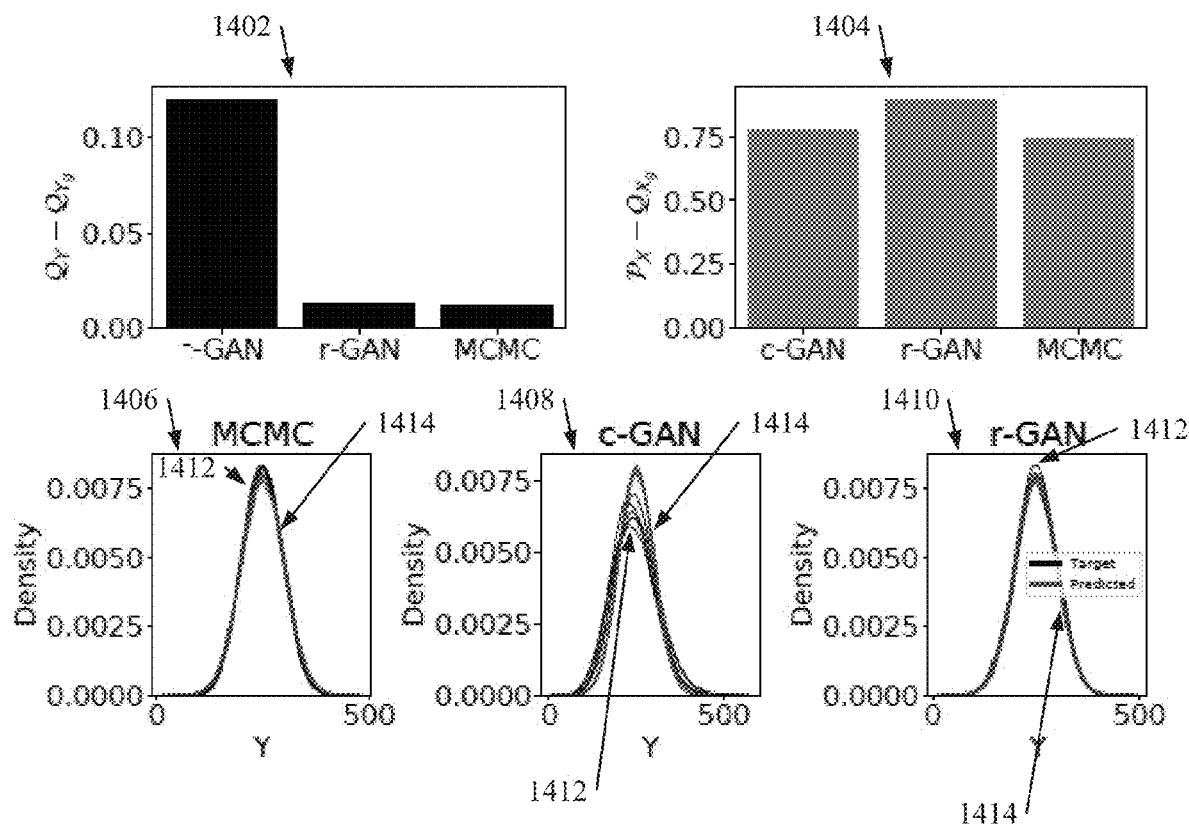
FIG. 14 illustrates a diagram of example, non-limiting graphs regarding divergence measurements to demonstrate the efficacy of employing a generative adversarial network to determine mechanistic causes of observed data in accordance with one or more embodiments described herein.

For example, FIG. 14 can regard a comparison of MCMC, example c-GAN 800, and example r-GAN 900 for inference of model input parameters of the high dimensional Rosenbrock function described herein. Graph 1402 can regard a JS-divergence measure between the generated output distribution $Q_{Y_g}$ upon applying the mechanistic model 122 to the inferred input parameters and the target output distribution $Q_Y$. For example, graph 1402 shows a bar-plot of the estimated JS-divergence between the generated and target output distribution for the example c-GAN 800, example r-GAN 900, and MCMC. Graph 1404 plots the divergence measure estimated in the input space for each of the example c-GAN 800, example r-GAN 900, and MCMC. The example c-GAN 800 can learn the multidimensional output function over the entire support of the prior distribution. Graphs 1406, 1408, and/or 1410 show plots of the marginal distributions of each of the generated output features upon propagating the inferred input parameters through the mechanistic model 122 for MCMC, example c-GAN 800, and example r-GAN 900, respectively. Lines 1412 can represent the marginal distribution of the generated output features, and lines 1414 can represent the marginal distribution of the target output distribution.

To further demonstrate the efficacy of the example c-GAN 800 and/or r-GAN 900, a synthetic dataset can be considered, where the Rosenbrock function of two input parameters can be employed as the mechanistic model 122. Samples of observation data with distribution $Q_{Y_c}$ corresponding to the control conditions from a Gaussian distribution with mean $\mu = 250$ and standard deviation of $\sigma = 50$, as shown in graph 1502 of FIG. 15. The ground-truth distribution of input parameters $G_{X_c}$ coherent to the $Q_{Y_c}$ is shown in graph 1506 as the black contour lines. Additionally, samples were generated from the distribution of ground-truth input parameters $G_{X_c}$, where linear scaling to the $x_2$ parameter can be applied (e.g., $x_{2,d} = 0.6_{x_{2,c}}$) to generate the ground-truth input parameter set for observations under intervention conditions.

The input parameter $x_1$ can be the shared input parameter $x_s$. The ground-truth distribution of input parameters after intervention $G_{X_d}$ can be shown in graph 1508. The intervention input parameters can be forwarded through the mechanistic model 122 (e.g., Rosenbrock function) to obtain the intervention target output distribution $Q_{Y_d}$, shown in graph 1504.

Figure 15:
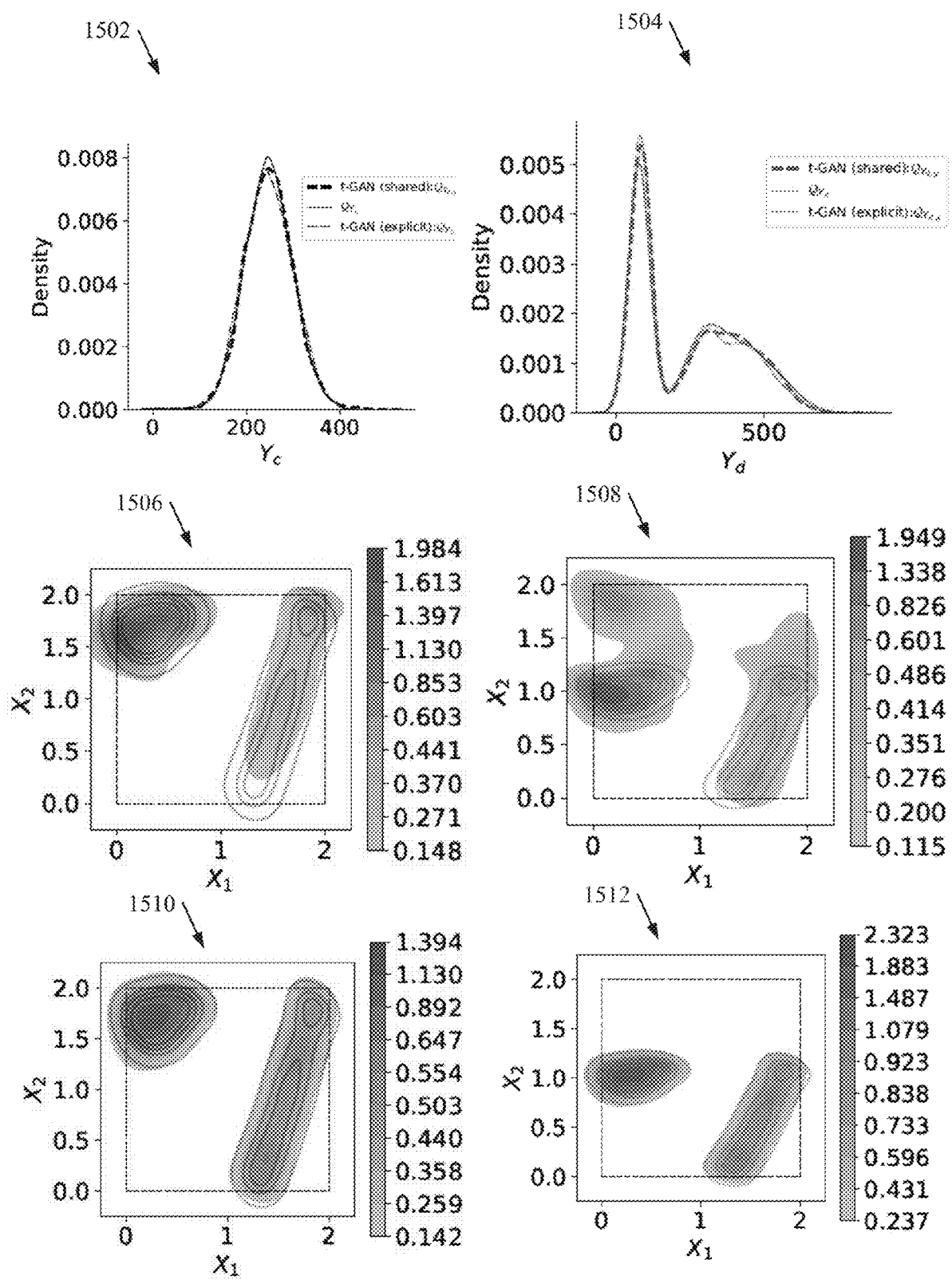
FIG. 15 illustrates a diagram of example, non-limiting graphs regarding parameter distribution density estimates to demonstrate the efficacy of employing a generative adversarial network to determine mechanistic causes of observed data in accordance with one or more embodiments described herein.

Further, the efficacy of the t-GAN examples described herein can be demonstrated with regards to shared variables (e.g., as shown in FIG. 10) to infer the distribution of model input parameters that produce output distributions with marginal distributions that can match the target output observation data distributions $Q_{Y_c}$ and $Q_{Y_d}$. The distribution of the inferred input parameters obtained via the first example t-GAN 1000 is shown via graphs 1506 and/or 1508. The generated distributions of input parameters can result in the output observation data distributions shown in graphs 1502 and/or 1504. As shown in FIG. 15, the generated output distribution can closely match the desired target distribution.

Moreover, efficacy of the second example t-GAN 1100, which uses a known deterministic map T, can be demonstrated. The second example t-GAN 1100 can produce distributions of input parameters shown in graphs 1510 and 1512, which can closely match the ground-truth distribution of input parameters (e.g., represented by contour lines 1514). The output distribution of the function corresponding to the generated input parameters can be shown in graphs 1502 and 1504.

For example, graph 1502 shows a KDE of the target distribution under control conditions $Q_{Y_c}$ and the generated (e.g., inferred) output distribution $Q_{Y_{c,g}}$ via first example r-GAN 1000 (e.g., employing shared variables) and second example r-GAN 1100 (e.g., employing explicit mapping). Graph 1504 shows a KDE of the target distribution regarded in graph 1502 after intervention. Graph 1506 shows joint distribution of model input parameters inferred via first example r-GAN 1000 (e.g., employing shared variables) for the control observation data with distribution $Q_{Y_c}$. Graph 1508 shows the joint distribution regarded in graph 1506 after intervention. The distribution of the ground-truth input parameters $G_{X_c}$ and $G_{X_d}$ used to generate the synthetic data population before and after intervention are shown in graphs 1510 and 1512 respectively.

In various embodiments, the mechanistic model 122 can be differentiable and directly incorporated as part of a deep learning network. For example, a forward model surrogate can be trained on samples from model calculations on the input parameters sampled from the prior distribution. For instance, an algorithm of smart sampling can be adopted to incrementally improve the surrogate models (e.g., both forward and inverse). In one or more embodiments, the one or more r-GAN structures described herein can incorporate informative auxiliary variables, where the target distribution can be conditioned on auxiliary variables derived from an observation data source other than model input parameters and/or model output domains. For example, the outputs of the mechanistic model 122 may be limited to a subset of measurements related to modeled system (e.g., related to the biological system). For example, observational data can be inaccessible with regards to the mechanistic model 122. This additional observational data can be incorporated into the mechanistic model 122 analysis by the machine learning component 110 by conditioning parameter inference on a multivariate random variable A with distribution $Q_A$. Auxiliary variables can be components such as A, which can be derived from source other than the mechanistic model 122 outputs. In various embodiments, the inputs to the one or more of the generator node G and the feature space discriminator node D of the r-GAN structures described herein can be augmented with auxiliary variables as conditioning inputs.

Figure 16:
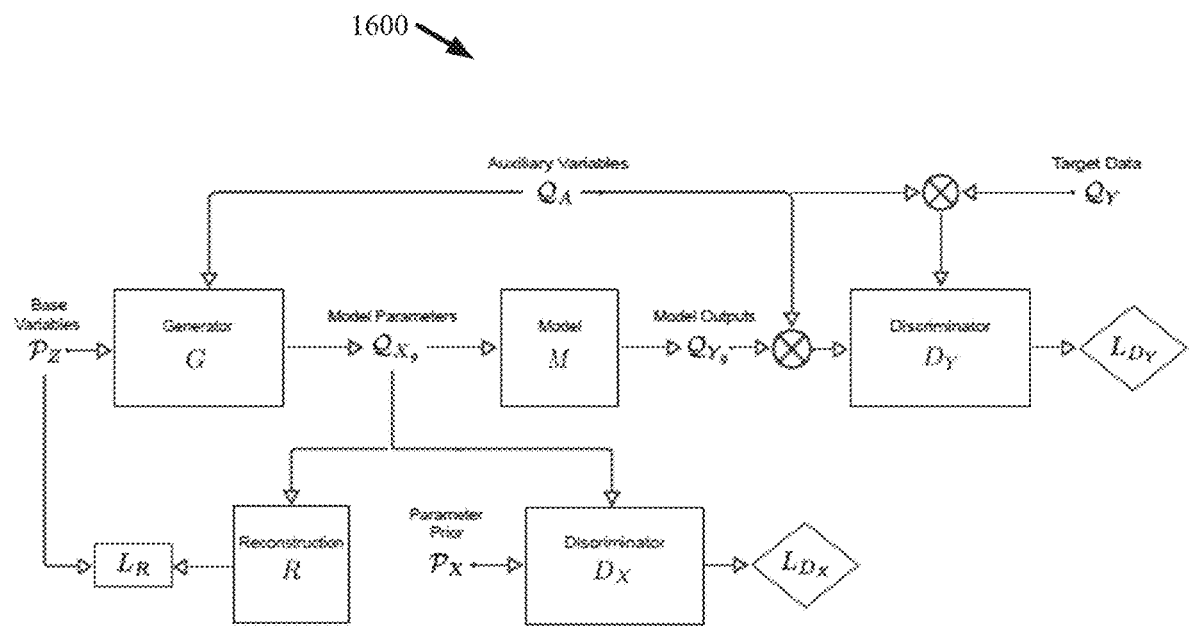
FIG. 16 illustrates a diagram of an example, non-limiting deep learning architecture that employ a conditional regularized generative adversarial network with auxiliary variables to determine mechanistic causes of observed data based on one or more mechanistic models in accordance with one or more embodiments described herein.

FIG. 16 illustrates a diagram of an example, non-limiting conditional regularized generative adversarial network ("crGAN") 1600 that can be generated and/or employed by the GAN component 702 in accordance with one or more embodiments described herein. Repetitive description of like elements employed in other embodiments described herein is omitted for sake of brevity. As shown in FIG. 16, the example crGAN 1600 can be an embodiment of the one or more r-GAN structures described herein for generating mechanistic model 122 (M) parameters $x_g$ that can produce outputs $y_g$ coherent with a set of observation data y, and that can be conditioned on auxiliary observation data a (e.g., derived from a source outside the domain of outputs of the mechanistic model 122). For example, the crGAN 1600 can be characterized by Equation 17 below.

$$\begin{aligned} \text{given} \quad & P_X, Q_{Y,A}, M \\ \text{minimize} \quad & D(P_X \| Q_{X_g}) \\ \text{subject to} \quad & supp(X_g) \subseteq supp(X), \\ & D(Q_{Y,A} \| Q_{Y_g,A}) = 0 \\ \text{where} \quad & [y_g, a] = [M(x_g), a] \sim Q_{Y_g,A} \\ & [x_g, a] \sim Q_{X_g,A} \end{aligned} \quad (17)$$

Where joint distributions $Q_{X,A}$, $Q_{X_g,A}$, and $Q_{Y,A}$ can have marginals $Q_X$, $Q_{X_g}$, and $Q_Y$, respectively. In Equation 17, $D(\bullet\|\bullet)$ can be an f-divergence measure (e.g., Jensen-Shannon ("JS") divergence).

Equation 17 can be solved by the machine learning component 110 use a GAN structure (e.g., cr-GAN) by minimizing divergence D $(P_X \| Q_{X_g})$ between a given prior distribution $P_X$ and generated model parameters $Q_{X_g}$ over network parameters θ in the generator node G: $z \sim P_Z$, $\tilde{z} \sim Q_A$, $x_g = G_\theta(z, a) \sim Q_{X_g}$; where $P_Z$ can be a Gaussian base distribution, $P_X$ can be the prior distribution of model parameters, and/or $Q_A$ can be the marginal of $Q_{Y,A}$ for auxiliary variable A. Additionally, the machine learning component 110 can minimize D $(Q_{Y,A} \| Q_{Y_g,A})$ over θ in the generator node G: $[y_g, a] = [M(G_\theta(z, a)), a] \sim Q_{Y_g,A}$; where M can be mechanistic model 122. To approximate D $(Q_{Y,A} \| Q_{Y_g,A}) = 0$ while minimizing D $(P_X \| Q_{X_g})$, the machine learning component 110 can incorporate the two objectives as separate discriminator nodes D with a weighted sum loss, such that the weight for the generator node G loss due to discriminator node $D_x$ can be smaller than that for Dr.

As shown in FIG. 16, the example crGAN 1600 can further comprise a reconstruction network R that can recreate Z from the output of generator node G, and a function M representing the mechanistic model 122. Further, discriminator node $D_Y$ can distinguish between samples from the joint distribution $Q_{Y,A}$ and samples generated by the generator node G forwarded through the mechanistic model 122 and augmented with the conditioning variable A, for which the standard conditional loss, characterized by Equation 18 below, can be maximized.

$$L_{D_Y} = \mathbb{E}_{y,a \sim Q_{Y,A}} \log[D_Y(y,a)] + \mathbb{E}_{z \sim P_Z, a \sim Q_A} \log[1 - D_Y(M(G(z,a)),a)] \quad (18)$$

Additionally, discriminator node $D_X$ can distinguish between samples from the prior distribution over mechanistic parameters $P_X$ and samples generated by the generator node G for which the standard loss, characterized by Equation 19 below, can be maximized.

$$L_{D_X} = \mathbb{E}_{x \sim P_X} \log[D_X(x)] + \mathbb{E}_{z \sim P_Z} \log[1 - D_X(G(z))] \quad (19)$$

Further, the reconstruction network R can aim to reproduce the original base distribution Z from samples generated by G, for which the squared loss, characterized by Equation 20 below, can be minimized.

$$L_R = \mathbb{E}_{z \sim P_Z, a \sim Q_A} [z - R(G(z,a))]^2 \quad (20)$$

Moreover, the generator node G can generate one or more mechanistic parameter sets from the base variable Z, augmented with the auxiliary observation data a, for which the weighted sum loss, characterized by Equation 21 below, can be minimized.

$$L_G = w_Y L_{D_Y} + w_X L_{D_X} + w_R L_R \quad (21)$$

Where $w_Y$ can be 1.0, $w_X$ can be 0.1, and/or $w_R$ can be 1.0.

To demonstrate the efficacy of the crGAN 1600 in various embodiments, the crGAN 1600 can be employed by an Adam optimizer with a step size of 0.00001 for G and R, 0.00002 for $D_X$, and 0.00001 for $D_Y$. The $\beta_1$ and/or $\beta_2$ parameters of the Adam optimizer can be set to default values of 0.9 and/or 0.999, respectively. A mini-batch size can be set to 100. Further, training can be performed (e.g., via training component 202) via two stages. In a first training stage, the generator node G, the reconstruction network R, and discriminator node $D_X$ can be trained together (e.g., for 100 epochs) to initialize the generator node G by minimizing D $(P_X \| Q_{X_g})$. In a second training stage, the crGAN can be trained (e.g., for 300 epochs) on a dataset y, $a \sim Q_{Y,A}$ of, for example, 10,000 samples.

In various examples described herein, divergence between distributions was tested with JS divergence, approximated using density ratio estimation with a binary classifier to approximate the KL divergence measure from the samples. JS divergence can be estimated using a classifier network trained to distinguish samples from the two distributions. Table 1, provided below, describes one or more details regarding neural networks used in various examples of the crGAN 1600 architecture described herein.

TABLE 1

| NETWORK | HIDDEN LAYERS | NODES PER LAYER | DROPOUT RATE | ACTIVATION FUNCTION |
|---|---|---|---|---|
| $D_X$ | 8 | 80 | 0.0 | RELU |
| $D_Y$ | 8 | 130.0 | 0.01 | RELU |
| G | 8 | 80 | 0.0 | RELU |
| R | 8 | 180 | 0.0 | RELU |

Figure 17A:
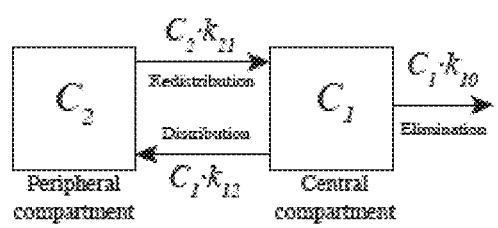
FIGS. 17A-E illustrate diagrams of example, non-limiting graphs regarding distributions of parameters, mechanistic model outputs, and auxiliary variables sampled as a synthetic training distribution to demonstrate the efficacy of employing a generative adversarial network to determine mechanistic causes of observed data in accordance with one or more embodiments described herein.
Figure 17B:
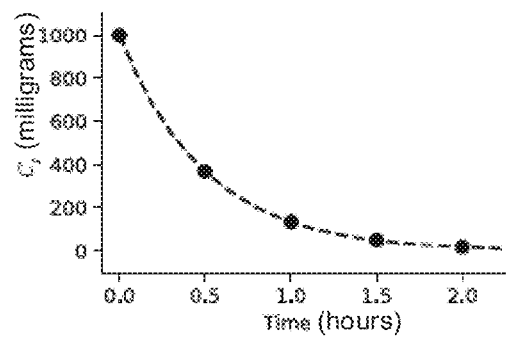
Figure 17C:
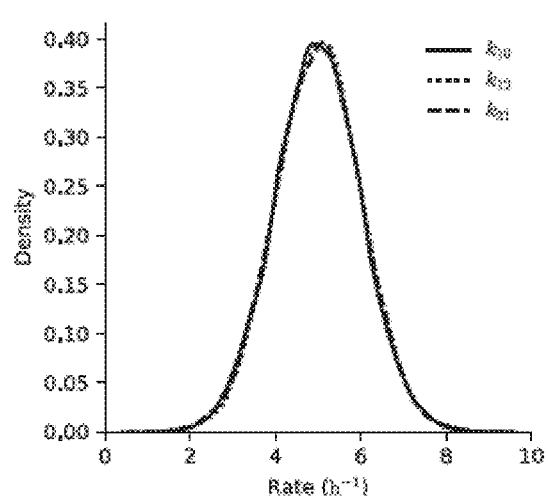
Figure 17D:
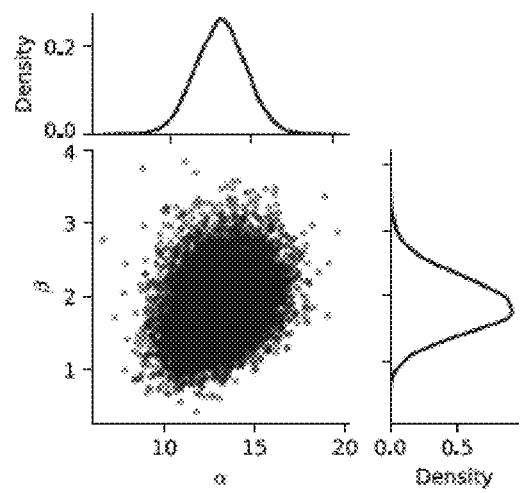
Figure 17E:
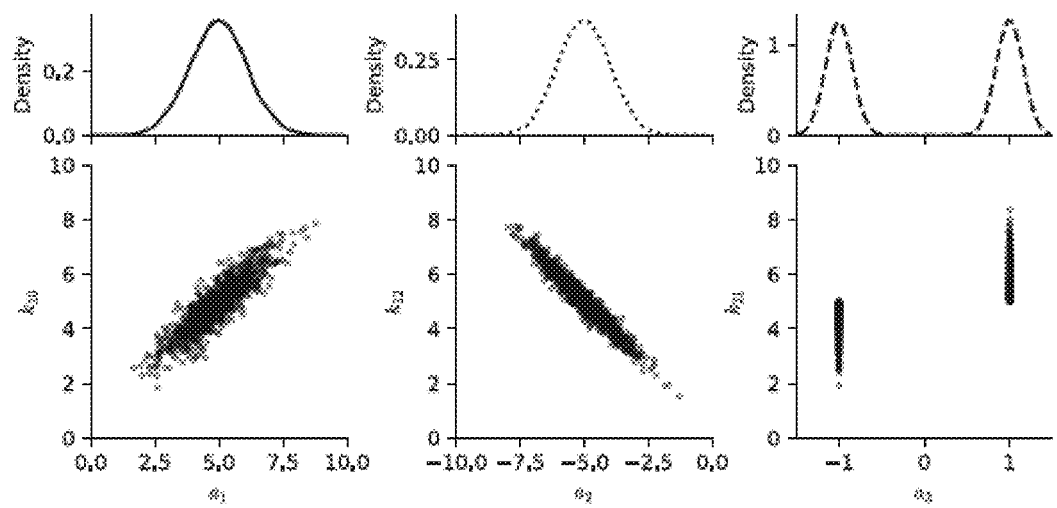

FIGS. 17A-17E illustrate diagrams of example, non-limiting graphs that can demonstrate the efficacy of employing the crGAN 1600 architecture to infer model parameters of a two-compartment mechanistic model 122 in accordance with one or more embodiments described herein. Repetitive description of like elements employed in other embodiments described herein is omitted for the sake of brevity. FIG. 17A, characterizes two-compartment mechanistic model 122 that can model the decay of a therapeutic compound intravenously injected into the central compartment of a biological system at an initial time point (e.g., t=0). Rate constants $k_{10}$, $k_{12}$, and/or $k_{21}$ can parameterize the mechanistic model 122, and an amount of the therapeutic compound $C_1$ can be recorded over time. FIG. 17B shows simulated data with rate parameters $k_{10}$, $k_{12}$, and/or $k_{21}$=5.0 hr$^{-1}$, with a fitted line of 8 that can result in extracted features of $\alpha$=13.09 hr$^{-1}$ and β=1.91 hr$^{-1}$. FIG. 17C shows densities of independent Gaussian distributions of parameters used to generate the emulated data. FIG. 17D shows distributions of a and/or 3 calculated from the parameters of FIG. 17C to create training data Y. FIG. 17E shows distributions of A variables generated from parameters X and paired with each sample in Y. For instance, the upper panels of FIG. 17E show densities of A distributions, and the lower panels of FIG. 17E show each A variable against the X variable that is calculated from.

To demonstrate the efficacy of the crGAN 1600 in various embodiments, the crGAN 1600 can be employed with regards to a two-compartment pharmacokinetic ("PK") mechanistic model 122 characterized by FIG. 17A. The example PK mechanistic model 122 can be an example model of a biological system (e.g., time course of a therapeutic compound concentration in a biological body), in which the model parameters can have inherent biological meaning (e.g., rates of compound distribution and/or elimination). As shown in FIG. 17A, the amount of therapeutic compound in a central compartment of the biological system (e.g., in blood plasma) and a peripheral compartment of the biological system (e.g., in body issues) can be represented by $C_1$ and $C_2$, respectively. For example, FIG. 17A can model an intravenous administration of a therapeutic compound dose directly into the central compartment, which can then exhibit a biphasic decay over time that is depicted in FIG. 17B. The decay can be fitted with a two-exponential decay curve in accordance with Equation 22 below.

$$C_1 = B_1 \cdot e^{-\alpha t} + B_2 \cdot e^{-\beta t} \quad (22)$$

Where $B_1$ and $B_2$ can be the intercepts of the two exponential curves. Also, $\alpha$ and $\beta$ can be the rate constants. As an alternative to simulating the mechanistic model 122 using the structure shown in FIG. 17A, explicit equations for $\alpha$ and $\beta$ (e.g., where the first order rate constants $k_{12}$, $k_{21}$, and $k_{10}$ can be known) can be defined in accordance with Equations 23-24 below.

$$\alpha = 0.5[(k_{10} + k_{12} + k_{21}) + \sqrt{(k_{10} + k_{12} + k_{21})^2 - (4 \times k_{21} \times k_{10})}] \quad (23)$$

$$\beta = 0.5[(k_{10} + k_{12} + k_{21}) + \sqrt{(k_{10} + k_{12} + k_{21})^2 - (4 \times k_{21} \times k_{10})}] \quad (24)$$

Three unknown mechanistic parameters can be defined as $X = [k_{12}, k_{21}, k_{21}]$, and two target observable measures, defined as $Y = [\alpha, \beta]$, can be modeled by the mechanistic model 122 M(x). Additionally, three auxiliary target observable parameters (e.g., not modeled by the mechanistic model 122) can be defined as $A = [a_1, a_2, a_3]$.

As synthetic observations, a cohort with underlying rate parameters $k_{12}, k_{21}, k_{10}$ independently distributed according to $\mathcal{N}(5,1)$ and truncated to the interval (0.1,10) can be assumed. FIG. 17C shows 10,000 samples from this distribution, and FIG. 17D shows the resulting synthesized observations of $\alpha$ and/or $\beta$ calculated from the samples. Auxiliary variables $a_1$, $a_2$, and/or $a_3$ can also by synthesized from the rate parameter samples for the example, to emulate a case where additional observation data of the biological system are influenced by underlying biological parameters in a way that is unknown and not modeled by the mechanistic model 122. For instance, $$a_1 = k_{10} + \mathcal{N}(0.0, 0.5^2),$$

$$a_2 = -k_{12} + \mathcal{N}(0.0, 0.25^2),$$

and $$a_3 = \begin{cases} 1, & \text{if } k_{12} \geq 5 \\ -1, & \text{otherwise} \end{cases}.$$

Additionally, distributions of the samples for the three variables A and the primary input parameters used to generate each variable are shown in FIG. 17E.

Given the synthetic target dataset $\mathcal{D}$ of 5 observed variables, shown in FIGS. 17D-E, two of which ($\alpha$ and $\beta$, designated Y) are matched to outputs of the PK mechanistic model 122 and three of which ($a_1$, $a_2$, $a_3$, designated A) can be related to PK simulation outputs; the crGAN 1600 can be trained to generate samples $Q_{X_g}$ from the distribution of model parameters ($k_{12}$, $k_{21}$, and $k_{10}$) that are consistent with $\mathcal{D}$, in that the pushforward of $Q_{X_g}$ by the mechanistic model 122 function M(x) (e.g., to create the model-induced distribution $Q_{X_g}$) can approximate the target distribution $Q_Y$. Further, when $Y_g$ and Y can both be augmented with the auxiliary variables A, the samples from the generator node G can also be consistent with the joint distribution $Q_{Y,A}$. By augmenting the base variables Z, which provide input to the generator node G, with a during training, the generator node G can become a conditional generator that, when provided samples from the base distribution $P_Z$ given a, can generate samples from $q_{X_g|A}(x_g|a)$ that can be coherent with $q_{Y|A}(y|a)$.

Figure 18A:
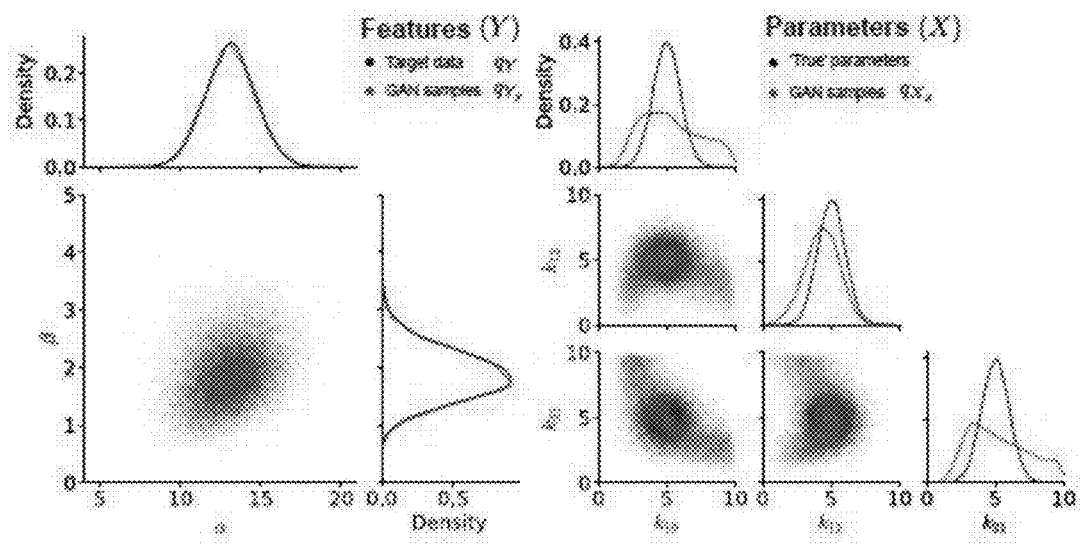
FIGS. 18A-B illustrate diagrams of example, non-limiting graphs regarding samples from a generator of a generative adversarial network with auxiliary variables after training to demonstrate the efficacy of employing a generative adversarial network to determine mechanistic causes of observed data in accordance with one or more embodiments described herein.
Figure 18B:
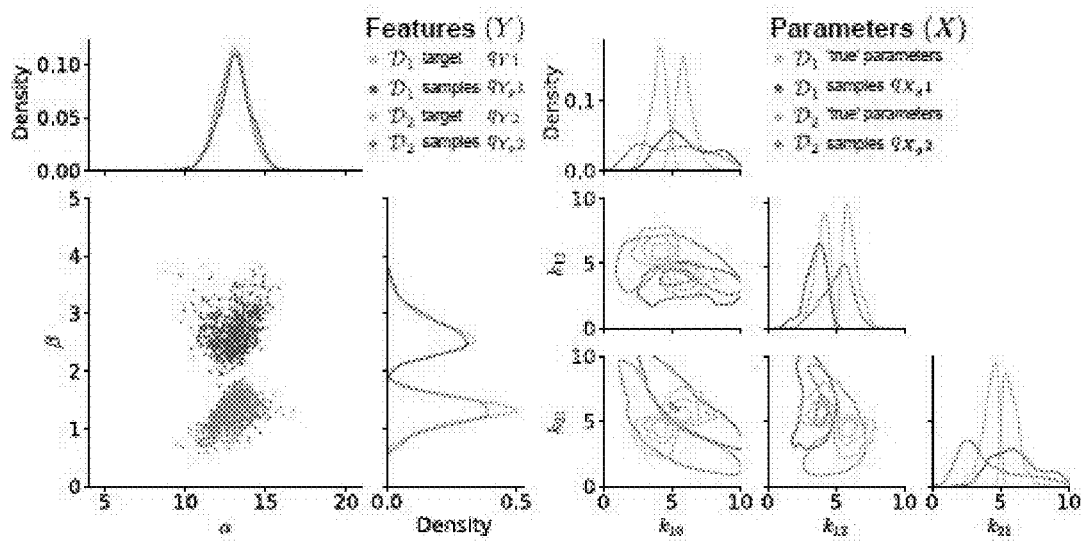

FIGS. 18A-B illustrate diagrams of example, non-limiting graphs that can depict sample data generated by the crGAN 1600 with regards to the PK mechanistic model 122 characterized in FIGS. 17A-E in accordance with one or more embodiments described herein. Repetitive description of like elements employed in other embodiments described herein is omitted for the sake of brevity. As shown on the left side of FIG. 18A, features $\alpha$ and $\beta(Y)$ of the PK model can be calculated using parameters of the mechanistic model 122 $x_g$ sampled from the generator node G, with the samples form A (e.g., shown in FIG. 17E) as conditioning inputs. As shown in FIG. 18A, the sampled features can match the target feature distribution. Further, the right side of FIG. 18A can show samples from the marginal distribution $Q_{X_g}$. Samples from distribution $Q_{X_g}$ can have lower divergence from the parameter prior $P_X$ than the training data. The left side of FIG. 18B can show simulated $Y_g$ calculated from $X_g$ conditioned on a from points in the dataset that are filtered based on constraints for $a_1$, $a_2$, and/or $a_3$.

FIG. 18A shows marginal densities and a scatter plot of the joint distribution of the target data $Q_Y$, approximated by $Q_{Y_g}$. Both the marginal and joint samples closely matched the target distributions. The X samples used to generate those target and sampled values Y are shown on the right of FIG. 18A, with marginal densities plotted for $k_{12}$, $k_{21}$, and $k_{10}$, along with histograms of the pairwise joint distributions. The original samples, drawn from $\mathcal{N}(5,1)$ independently for each parameter and used to generate the synthetic target data are shown in black, and the generated samples from $Q_{X_g}$ are shown. In various embodiments, the crGAN 1600 can estimate the mechanistic model 122 parameter distributions given the available data and mechanistic model 122 assumptions. As exemplified in the $k_{21}$ vs. $k_{10}$ panel of FIG. 18A, the mechanistic model 122 can be non-invertible and infinite combinations of mechanistic model 122 parameters sets can give rise to $Q_Y$. A reduction in one can compensate for an increase in the other while maintaining nearly constant values of $\alpha$ and/or $\beta$. Therefore, distributions can be compared according to the constraints imposed in Equation 17. After training the generator node G, sampling can be performed (e.g., via the machine learning component 110) in a manner consistent with $q_{Y,A}(y|a)$ by providing subsets of samples from $Q_A$ as conditioning inputs to generator node G. This approach was tested by extracting two disjoint subsets of $\mathcal{D}$: first with $a_1 > 5.5$, $a_2 > -4.5$, and $a_3 = 1$, termed $\mathcal{D}_1$; and second with $a_1 < 4.5$, $a_2 < -5.5$, and $a_3 = -1$, termed $\mathcal{D}_2$. FIG. 18B shows the marginal and joint distributions for Y variables, as in FIG. 18A, for $\mathcal{D}_1$ and $\mathcal{D}_2$. Samples from the generator node G, given a from $\mathcal{D}_1$ as conditional input, can be distributed according to $Q_{X_{g1}}$, which when forwarded through M(x) can produce the model-induced conditional distribution $Q_{Y_{g1}}$ shown in FIG. 18B.

By examining the distributions of X sampled using the two disjoint subsets with a as conditioning inputs to the generator node G, the machine learning component 110 can identify regions of mechanistic parameter space that can be specifically associated with delineations in the observation data. The right of FIG. 18B shows the X employed to generate the data that was incorporated into $\mathcal{D}_1$ and $\mathcal{D}_2$. The sampled mechanistic parameter distributions can reveal distinctions associated with each of the subsets. For example, $\mathcal{D}_1$ can be associated with samples having lower values of $k_{12}$ and $k_{10}$. The distributions of $Q_{X_{g1}}$ and $Q_{X_{g2}}$ can have lower divergence from $P_X$ in the X data than the true distributions have, demonstrating the minimization of $D(P_X \| Q_{X_g})$ while maintaining the constraint $D(Q_{Y,A} \| Q_{Y_g,A}) = 0$, as shown on the left of FIG. 18B.

FIGS. 18A-B show the distributions of parameters sampled relative to a uniform prior distribution in the parameter space of the mechanistic model 122, using $w_X = 0.1$ and $w_Y = 1.0$. To meet the constraint of approximating $D(Q_{Y,A} \| Q_{Y,A}) = 0$, $w_Y$ can be greater than $w_X$. If $w_x$ is increased while maintaining the quality of approximation to $D(Q_{Y,A} \| Q_{Y,A}) = 0$, the diversity of the parameter space samples can be increased relative to the parameter prior distribution $P_X$.

Figures 19A, 19B:
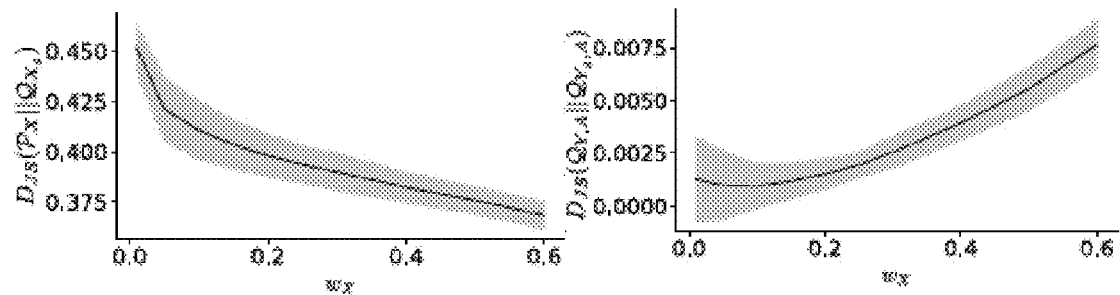
FIGS. 19A-19D illustrate diagrams of example, non-limiting graphs regarding the use of a generative adversarial network with auxiliary variables to determine mechanistic causes of observed data based on one or more mechanistic models in accordance with one or more embodiments described herein.
Figures 19C, 19D:
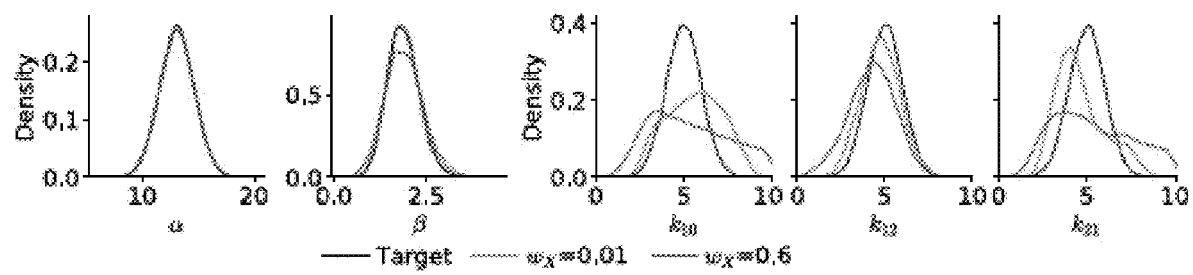

FIGS. 19A-D can show increasing $D_{JS}(Q_{Y,A} \| Q_{Y_g,A})$ and decreasing $D_{JS}(P_X \| Q_{X_g})$, respectively, as $w_X$ increases. FIG. 19A can show the mean standard deviation of $D_{JS}(P_X \| Q_{X_g})$ across 5 trails while varying $w_X$. The parameter space divergence can decrease with increasing weighting of $L_{D_X}$. FIG. 19B can show the mean standard deviation of $D_{JS}(Q_{Y,A} \| Q_{Y_g,A})$ across 5 trials while varying $w_X$. FIG. 19C can show target and/or simulated features calculated from samples from crGANs 1600 trained with $w_X = 0.01$ or $w_X = 0.6$. FIG. 19D shows sampled parameters from crGANs 1600 trained with $w_X = 0.01$ or $w_X = 0.6$. For $w_X = 0.01$, parameter distribution can have a higher divergence from the uniform prior distribution that in FIG. 18B, while feature distribution is similar to FIG. 18A. With $w_X = 0.6$, parameter distribution can have a lower divergence from the uniform prior distribution than in FIG. 18B, but the feature distribution in FIG. 19C can have a higher divergence from the target than in FIG. 18A. For $w_X \leq 0.1$, reductions in $D_{JS}(P_X \| Q_{X_g})$ were not accompanied by an increase in $D_{JS}(Q_{Y,A} \| Q_{Y_g,A})$, indicating an improved fit to the parameter prior with no loss of accuracy of fit to the target features. Therefore, in various embodiments $w_X = 0.1$ can be employed.

Figure 20A:
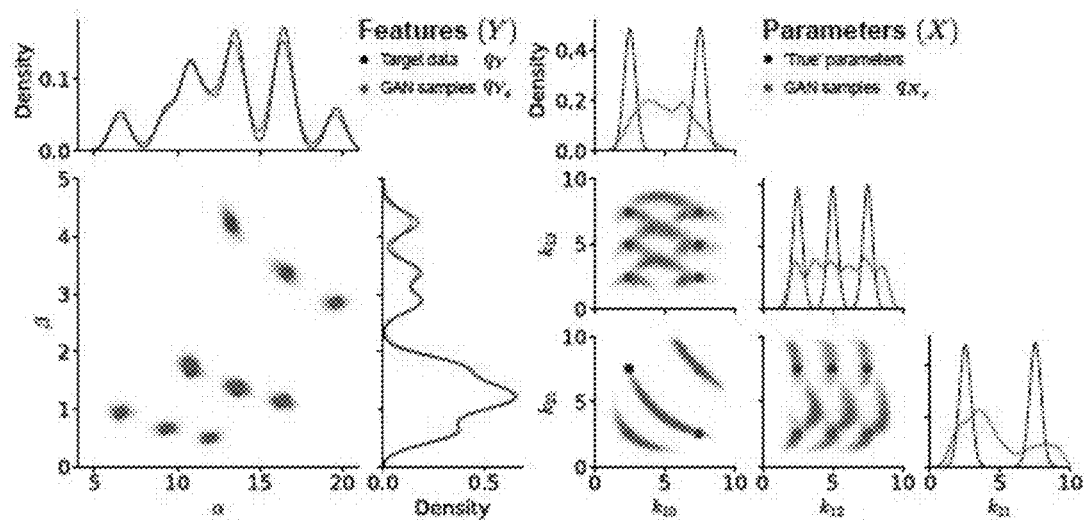
FIGS. 20A-20B illustrate diagrams of example, non-limiting graphs regarding multi-model target distributions associated with a generative adversarial network with auxiliary variables employed to determine mechanistic causes of observed data based on one or more mechanistic models in accordance with one or more embodiments described herein.
Figure 20B:
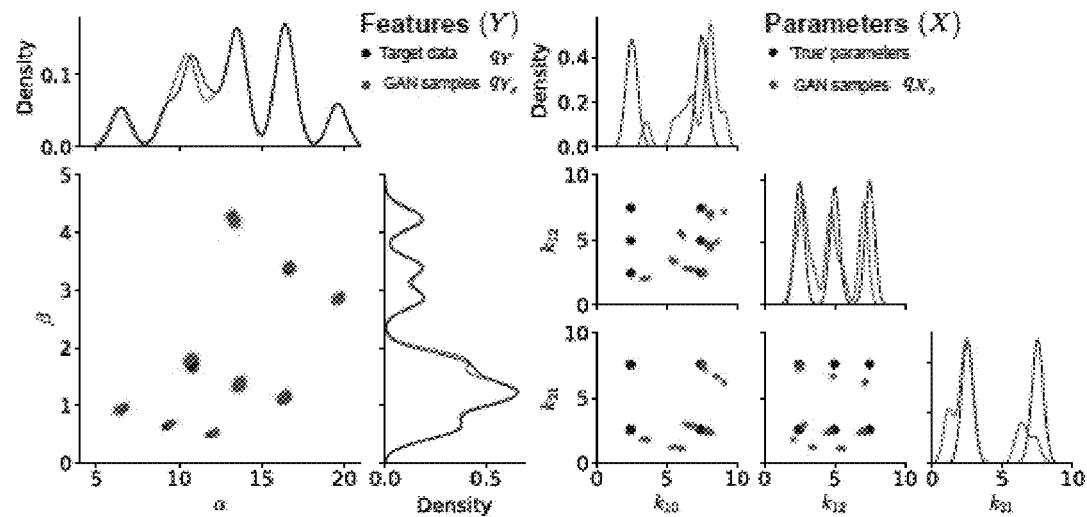

FIGS. 20A-B illustrate diagrams of the example, non-limiting crGAN 1600 architecture further tested with a multi-modal target distribution in accordance with one or more embodiments described herein. Repetitive description of like elements employed in other embodiments described herein is omitted for the sake of brevity. For example, the number of modes in the true data distribution was increased to add complexity while maintaining the established mechanistic modeling problem. FIG. 20A shows a $Q_Y$ distribution simulated from a 12-mode distribution in X. Samples $Q_{X_g}$ from the crGAN 1600 trained with corresponding $Q_Y$ are shown with the pushforward of $Q_{X_g}$ by M, $Q_{Y_g}$. The distribution has 9 modes in Y in FIG. 20A, which can demonstrate that the non-invertibility of the mechanistic model 122 (e.g., with some modes in Y being simulated by multiple different modes in X). Samples from $Q_{Y_g}$ closely approximate $Q_Y$, and the discriminator node $D_X$ can encourage a spread of samples in X across multiple regions of the parameter space, approximating $P_X$ given the constraint to match $Q_Y$.

Next the quality of sampling after removing two components of the crGAN 1600 architecture was tested via: regularization of the generator node G by removing the reconstruction network R, and removing the constraint to match the parameter prior distribution $P_X$ by setting $w_X = 0$. FIG. 20B demonstrates that without these two components, the crGAN 1600 can still produce a reasonable fit to $Q_Y$ with $Q_{Y_g}$ but with reduced within-mode diversity when compared to the results of the components included (e.g., as shown in FIG. 20A). Further, the right of FIG. 20B shows that a small subset of possible parameter space modes can be found in this configuration by the generated $Q_{Y_g}$.

The use of uniform $P_X$ in discriminator node $D_X$ in various examples described herein can result in a spread of samples to as many modes as possible in X while approximating $D(Q_{Y,A} \| Q_{Y_g,A}) = 0$. To demonstrate the effect of incorporating additional information into $P_X$, the crGAN 1600 was trained using the 12-mode distribution with the uniform prior distribution for $k_{12}$ and $k_{21}$, but using a mixture of two Gaussians for the prior of $k_{10}$ (e.g., identical to the distribution of $k_{10}$ used to generate the 12-mode training data.

Figure 21:
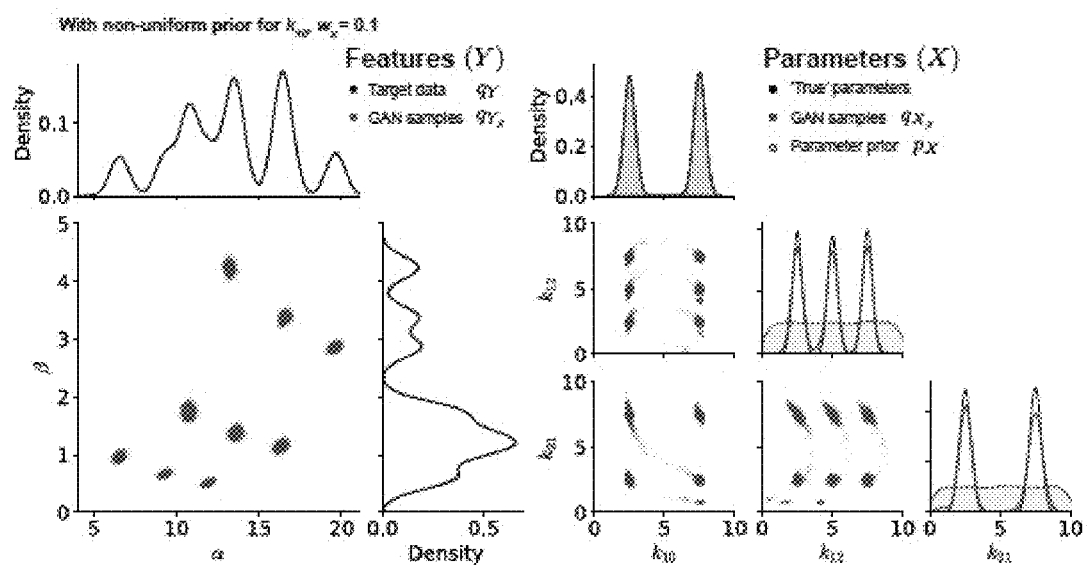
FIG. 21 illustrates a diagram of example, non-limiting graphs regarding multi-model target distributions associated with a generative adversarial network with auxiliary variables employed to determine mechanistic causes of observed data based on one or more mechanistic models in accordance with one or more embodiments described herein.

FIG. 21 illustrates diagrams of example, non-limiting graphs regarding employing the crGAN 1600 with multi-modal target distribution with multi-modal prior distribution in $k_{10}$ in accordance with one or more embodiments described herein. Repetitive description of like elements employed in other embodiments described herein is omitted for the sake of brevity. The left portion of FIG. 21 show target feature distribution for 12-mode parameter distribution and samples from the crGAN 1600. The right portion of FIG. 21 shows observation data and samples in the parameter space for 12-mode distribution. The dotted lines and shaded regions show samples from the prior distribution. To achieve the results shown in FIG. 21, training of the crGAN 1600 was continued for 900 epochs to allow $q_{X_g}$ to converge to $p_X$ in $k_{10}$. The left portion of FIG. 21 shows that $q_{Y_g}$ can closely match $q_Y$. Also, the right portion of FIG. 21 can show the marginal samples $q_{X_g}$ for $k_{10}$ can closely match $p_X$. Further, in $k_{12}$ and $k_{21}$ the $q_{X_g}$ samples can also closely match the parameter samples, despite no additional prior information being provided. The $q_{X_g}$ samples can predominantly fall within the 12 modes. For example, the additional prior distribution in $k_{10}$ can provide enough information to constrain the sampling to the true distribution.

Figure 22:
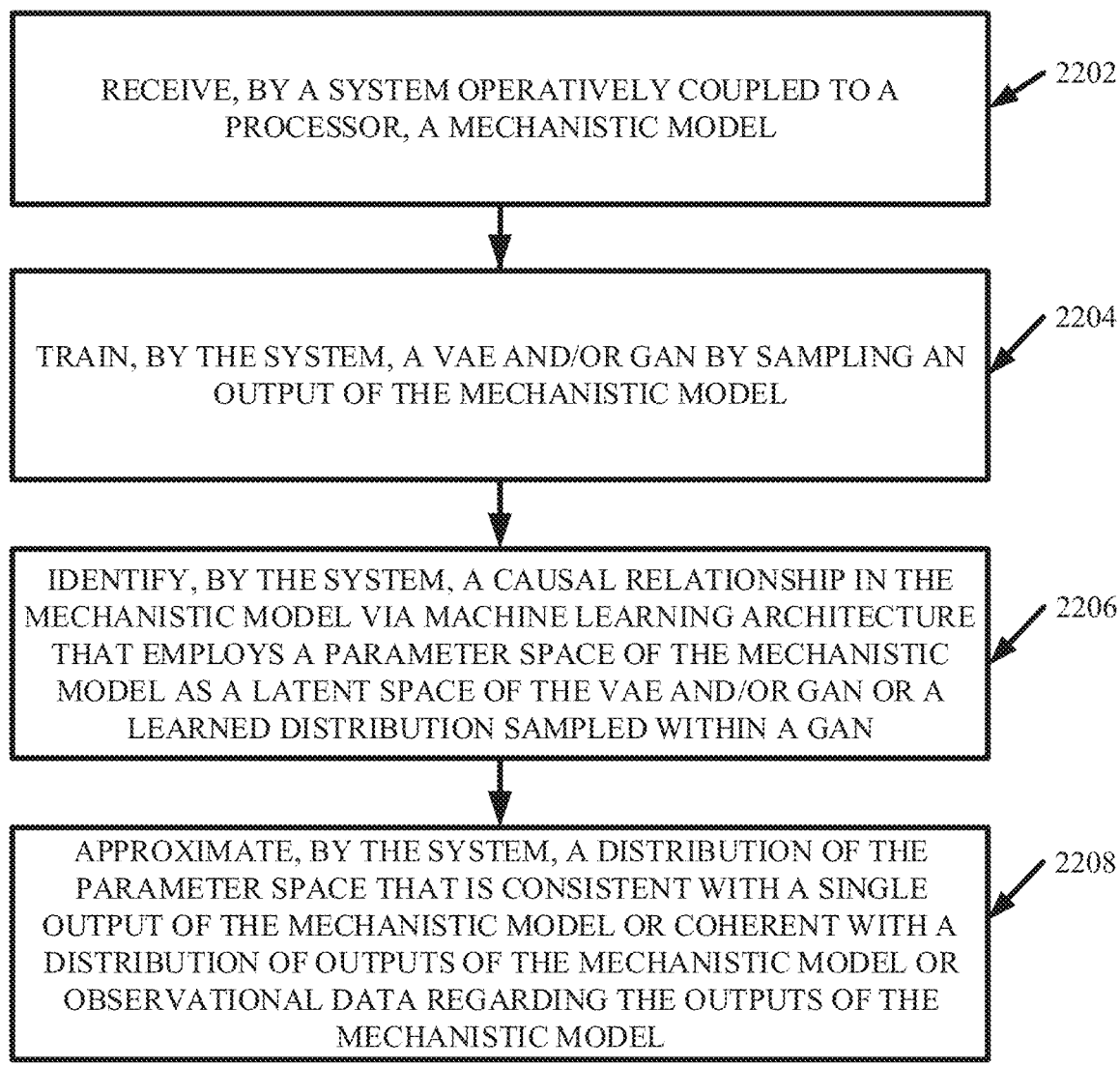
FIG. 22 illustrates a flow diagram of an example, non-limiting computer-implemented method that can employ one or more machine learning networks to render a learned distribution coherent with a parameter space of a mechanistic model to identify one or more causal relationships in accordance with one or more embodiments described herein.

FIG. 22 illustrates a flow diagram of an example, non-limiting computer-implemented method 2200 that can be employed by the system 100 to identify one or more causal relationships between one or more parameters and outputs of one or more mechanistic models 122 in accordance with one or more embodiments described herein. Repetitive description of like elements employed in other embodiments described herein is omitted for the sake of brevity.

At 2202, the computer-implemented method 2200 can comprise receiving (e.g., via communications component 112), by a system 100 operatively coupled to a processor 120, one or more mechanistic models 122. In accordance with various embodiments described herein, the one or more mechanistic models 122 can characterize one or more biological systems. For example, the one or more mechanistic models 122 can model observation data regarding one or more biological systems interacting with one or more variables (e.g., interacting with one or more therapeutic compounds).

At 2204, the computer-implemented method 2200 can comprise training (e.g., via training component 202), by the system 100, one or more VAEs and/or GANs by sampling one or more outputs of the mechanistic model 122. For example, the one or more mechanistic models 122 can serve as decoder nodes within one or more VAE architectures. At 2206, the computer-implemented method 2200 can comprise identifying (e.g., via machine learning component 110), by the system 100, one or more causal relationships in the one or more mechanistic models 122 via machine learning architecture that can employ a parameter space of the mechanistic models 122 as a latent space of the one or more VAEs and/or learned distributions sampled within one or more GANs. Example VAE and/or GAN architectures that can employ the mechanistic model 122 parameter space as a latent space or learned distribution can include, but are not limited to, at least those architectures shown in FIGS. 4-6, 8-11 and 16. At 2208, the computer-implemented method 2200 can comprise approximating (e.g., via the machine learning component 110), by the system 100, a distribution of the parameter space that is consistent with a single output of the mechanistic models 122 or coherent with a distribution of outputs of the mechanistic models 122. For example, the approximation at 2208 can leverage the causal relationship identified at 2206 to infer mechanist model 122 parameters that can result in one or more targeted outputs when processed by the one or more mechanistic models 122 in accordance with various embodiments described herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows: On-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows: Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises. Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Figure 23:
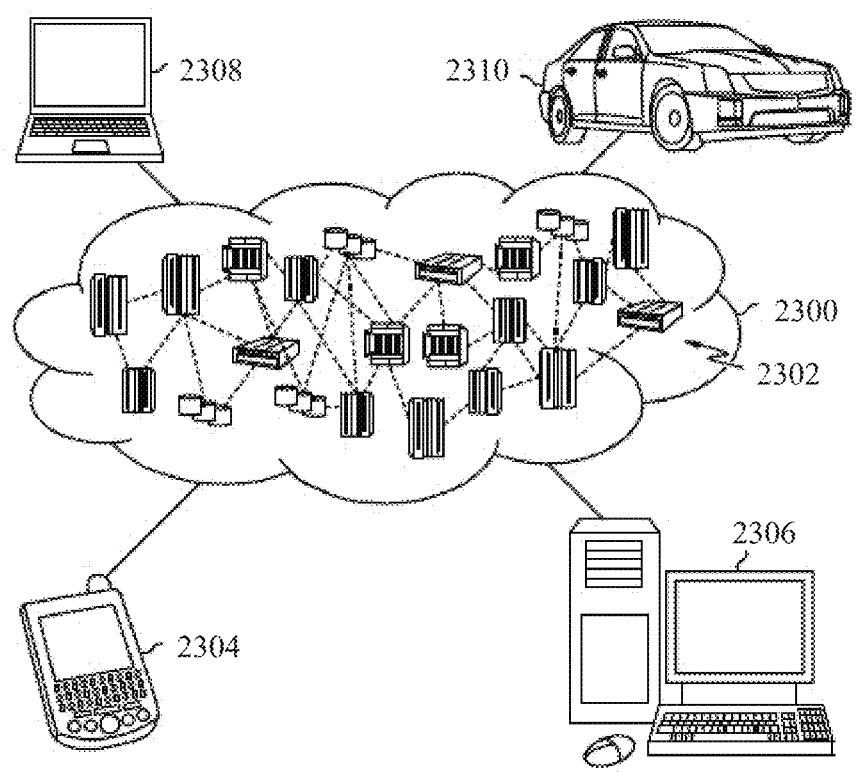
FIG. 23 depicts a cloud computing environment in accordance with one or more embodiments described herein.

A cloud computing environment is service oriented with a focus on statelessness, low coupling, modularity, and semantic interoperability. At the heart of cloud computing is an infrastructure that includes a network of interconnected nodes. Referring now to FIG. 23, illustrative cloud computing environment 2300 is depicted. As shown, cloud computing environment 2300 includes one or more cloud computing nodes 2302 with which local computing devices used by cloud consumers, such as, for example, personal digital assistant (PDA) or cellular telephone 2304, desktop computer 2306, laptop computer 2308, and/or automobile computer system 2310 may communicate. Nodes 2302 may communicate with one another. They may be grouped (not shown) physically or virtually, in one or more networks, such as Private, Community, Public, or Hybrid clouds as described hereinabove, or a combination thereof. This allows cloud computing environment 2300 to offer infrastructure, platforms and/or software as services for which a cloud consumer does not need to maintain resources on a local computing device. It is understood that the types of computing devices 2304-2310 shown in FIG. 23 are intended to be illustrative only and that computing nodes 2302 and cloud computing environment 2300 can communicate with any type of computerized device over any type of network and/or network addressable connection (e.g., using a web browser).

Figure 24:
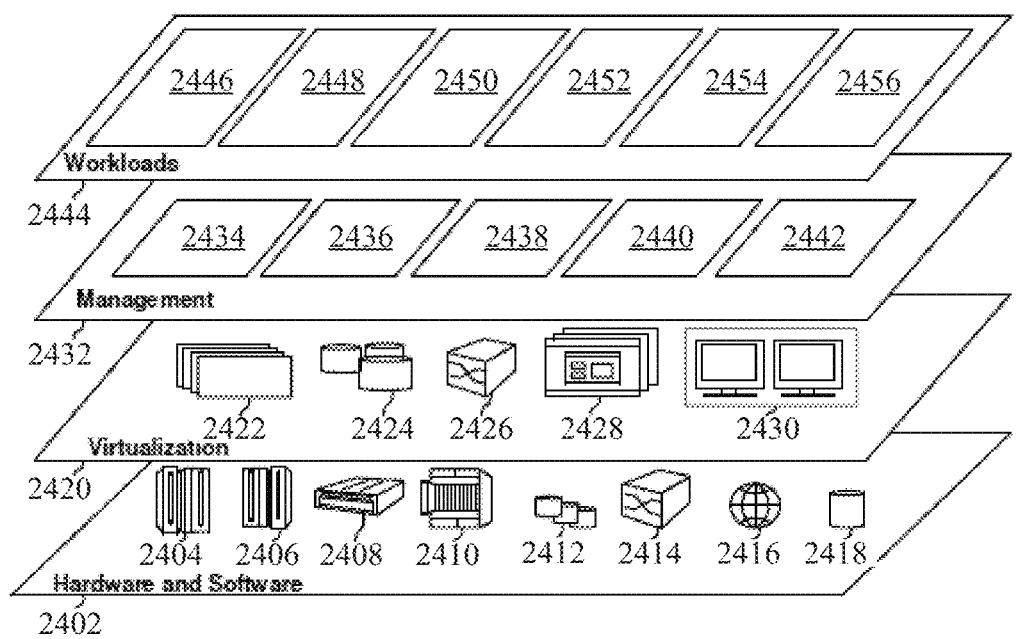
FIG. 24 depicts abstraction model layers in accordance with one or more embodiments described herein.

Referring now to FIG. 24, a set of functional abstraction layers provided by cloud computing environment 2300 (FIG. 23) is shown. Repetitive description of like elements employed in other embodiments described herein is omitted for the sake of brevity. It should be understood in advance that the components, layers, and functions shown in FIG. 24 are intended to be illustrative only and embodiments of the invention are not limited thereto. As depicted, the following layers and corresponding functions are provided.

Hardware and software layer 2402 includes hardware and software components. Examples of hardware components include: mainframes 2404; RISC (Reduced Instruction Set Computer) architecture based servers 2406; servers 2408; blade servers 2410; storage devices 2412; and networks and networking components 2414. In some embodiments, software components include network application server software 2416 and database software 2418. Virtualization layer 2420 provides an abstraction layer from which the following examples of virtual entities may be provided: virtual servers 2422; virtual storage 2424; virtual networks 2426, including virtual private networks; virtual applications and operating systems 2428; and virtual clients 2430.

In one example, management layer 2432 may provide the functions described below. Resource provisioning 2434 provides dynamic procurement of computing resources and other resources that are utilized to perform tasks within the cloud computing environment. Metering and Pricing 2436 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2438 provides access to the cloud computing environment for consumers and system administrators. Service level management 2440 provides cloud computing resource allocation and management such that required service levels are met. Service Level Agreement (SLA) planning and fulfillment 2442 provide pre-arrangement for, and procurement of, cloud computing resources for which a future requirement is anticipated in accordance with an SLA.

Workloads layer 2444 provides examples of functionality for which the cloud computing environment may be utilized. Examples of workloads and functions which may be provided from this layer include: mapping and navigation 2446; software development and lifecycle management 2448; virtual classroom education delivery 2450; data analytics processing 2452; transaction processing 2454; and mechanistic model processing 2456. Various embodiments of the present invention can utilize the cloud computing environment described with reference to FIGS. 23 and 24 to generate machine learning networks 114 that can render the latent space of a VAE and/or learned distributions sampled within a GAN that is coherent with the parameter space of a mechanistic model 122 to identify one or more causal relationships modeled by the mechanistic models 122.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 25:
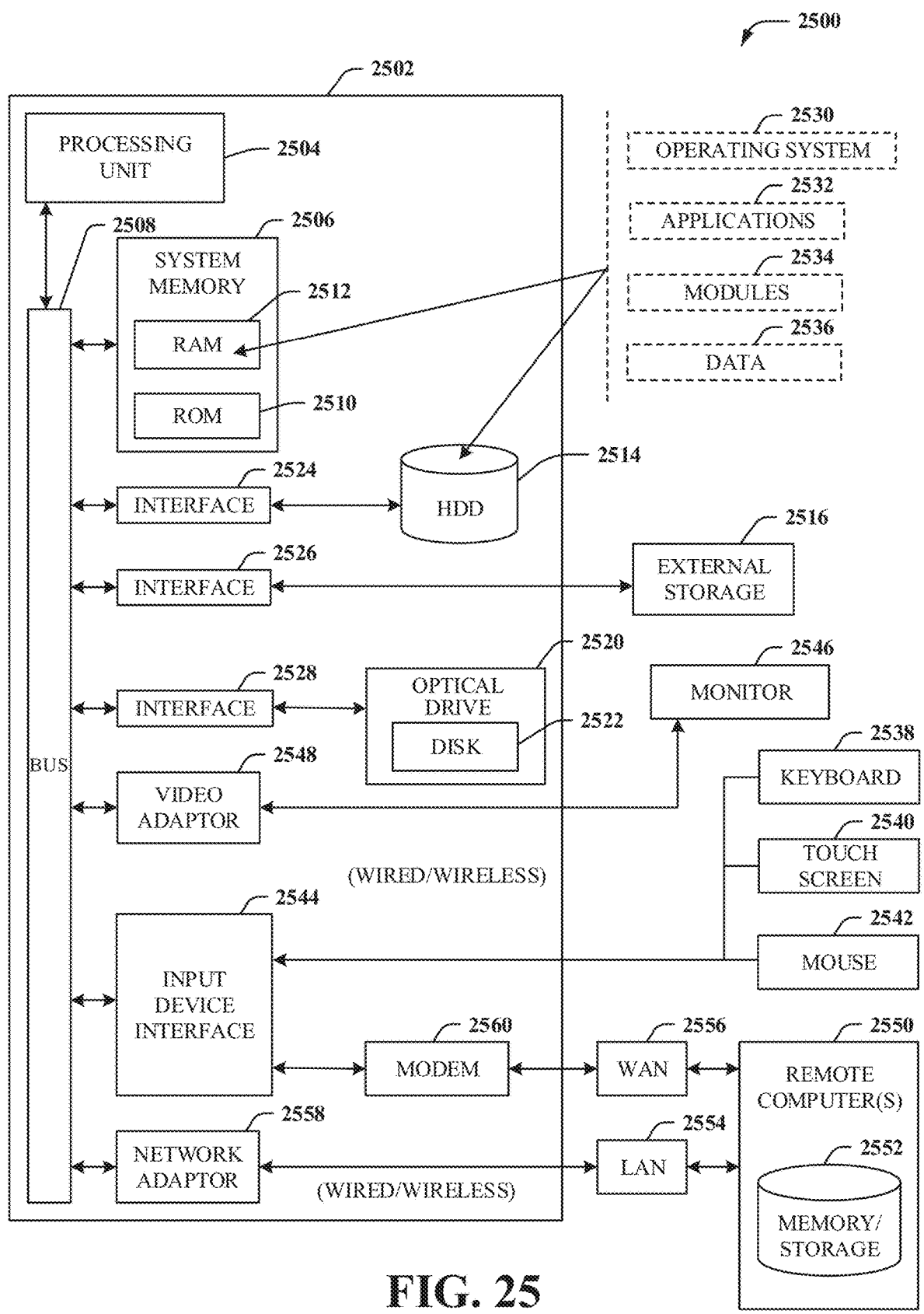
FIG. 25 illustrates a block diagram of an example, non-limiting operating environment in which one or more embodiments described herein can be facilitated.

In order to provide additional context for various embodiments described herein, FIG. 25 and the following discussion are intended to provide a general description of a suitable computing environment 2500 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, and/or the like, that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things ("IoT") devices, distributed computing systems, as well as personal computers, handheld computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory ("RAM"), read only memory ("ROM"), electrically erasable programmable read only memory ("EEPROM"), flash memory or other memory technology, compact disk read only memory ("CD-ROM"), digital versatile disk ("DVD"), Blu-ray disc ("BD") or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium. Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 25, the example environment 2500 for implementing various embodiments of the aspects described herein includes a computer 2502, the computer 2502 including a processing unit 2504, a system memory 2506 and a system bus 2508. The system bus 2508 couples system components including, but not limited to, the system memory 2506 to the processing unit 2504. The processing unit 2504 can be any of various commercially available processors. Dual microprocessors and other multi-processor architectures can also be employed as the processing unit 2504. The system bus 2508 can be any of several types of bus structure that can further interconnect to a memory bus (with or without a memory controller), a peripheral bus, and a local bus using any of a variety of commercially available bus architectures. The system memory 2506 includes ROM 2510 and RAM 2512. A basic input/output system ("BIOS") can be stored in a non-volatile memory such as ROM, erasable programmable read only memory ("EPROM"), EEPROM, which BIOS contains the basic routines that help to transfer information between elements within the computer 2502, such as during startup. The RAM 2512 can also include a high-speed RAM such as static RAM for caching data.

The computer 2502 further includes an internal hard disk drive ("HDD") 2514 (e.g., EIDE, SATA), one or more external storage devices 2516 (e.g., a magnetic floppy disk drive ("FDD") 2516, a memory stick or flash drive reader, a memory card reader, a combination thereof, and/or the like) and an optical disk drive 2520 (e.g., which can read or write from a CD-ROM disc, a DVD, a BD, and/or the like). While the internal HDD 2514 is illustrated as located within the computer 2502, the internal HDD 2514 can also be configured for external use in a suitable chassis (not shown). Additionally, while not shown in environment 2500, a solid state drive ("SSD") could be used in addition to, or in place of, an HDD 2514. The HDD 2514, external storage device(s) 2516 and optical disk drive 2520 can be connected to the system bus 2508 by an HDD interface 2524, an external storage interface 2526 and an optical drive interface 2528, respectively. The interface 2524 for external drive implementations can include at least one or both of Universal Serial Bus ("USB") and Institute of Electrical and Electronics Engineers ("IEEE") 1394 interface technologies. Other external drive connection technologies are within contemplation of the embodiments described herein.

The drives and their associated computer-readable storage media provide nonvolatile storage of data, data structures, computer-executable instructions, and so forth. For the computer 2502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2512, including an operating system 2530, one or more application programs 2532, other program modules 2534 and program data 2536. All or portions of the operating system, applications, modules, and/or data can also be cached in the RAM 2512. The systems and methods described herein can be implemented utilizing various commercially available operating systems or combinations of operating systems. Computer 2502 can optionally comprise emulation technologies. For example, a hypervisor (not shown) or other intermediary can emulate a hardware environment for operating system 2530, and the emulated hardware can optionally be different from the hardware illustrated in FIG. 25. In such an embodiment, operating system 2530 can comprise one virtual machine ("VM") of multiple VMs hosted at computer 2502. Furthermore, operating system 2530 can provide runtime environments, such as the Java runtime environment or the .NET framework, for applications 2532. Runtime environments are consistent execution environments that allow applications 2532 to run on any operating system that includes the runtime environment. Similarly, operating system 2530 can support containers, and applications 2532 can be in the form of containers, which are lightweight, standalone, executable packages of software that include, e.g., code, runtime, system tools, system libraries and settings for an application.

Further, computer 2502 can be enable with a security module, such as a trusted processing module ("TPM"). For instance with a TPM, boot components hash next in time boot components, and wait for a match of results to secured values, before loading a next boot component. This process can take place at any layer in the code execution stack of computer 2502, e.g., applied at the application execution level or at the operating system ("OS") kernel level, thereby enabling security at any level of code execution. A user can enter commands and information into the computer 2502 through one or more wired/wireless input devices, e.g., a keyboard 2538, a touch screen 2540, and a pointing device, such as a mouse 2542. Other input devices (not shown) can include a microphone, an infrared ("IR") remote control, a radio frequency ("RF") remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2504 through an input device interface 2544 that can be coupled to the system bus 2508, but can be connected by other interfaces, such as a parallel port, an IEEE 1394 serial port, a game port, a USB port, an IR interface, a BLUETOOTH® interface, and/or the like.

A monitor 2546 or other type of display device can be also connected to the system bus 2508 via an interface, such as a video adapter 2548. In addition to the monitor 2546, a computer typically includes other peripheral output devices (not shown), such as speakers, printers, a combination thereof, and/or the like. The computer 2502 can operate in a networked environment using logical connections via wired and/or wireless communications to one or more remote computers, such as a remote computer(s) 2550. The remote computer(s) 2550 can be a workstation, a server computer, a router, a personal computer, portable computer, microprocessor-based entertainment appliance, a peer device or other common network node, and typically includes many or all of the elements described relative to the computer 2502, although, for purposes of brevity, only a memory/storage device 2552 is illustrated. The logical connections depicted include wired/wireless connectivity to a local area network ("LAN") 2554 and/or larger networks, e.g., a wide area network ("WAN") 2556. Such LAN and WAN networking environments are commonplace in offices and companies, and facilitate enterprise-wide computer networks, such as intranets, all of which can connect to a global communications network, e.g., the Internet.

When used in a LAN networking environment, the computer 2502 can be connected to the local network 2554 through a wired and/or wireless communication network interface or adapter 2558. The adapter 2558 can facilitate wired or wireless communication to the LAN 2554, which can also include a wireless access point ("AP") disposed thereon for communicating with the adapter 2558 in a wireless mode. When used in a WAN networking environment, the computer 2502 can include a modem 2560 or can be connected to a communications server on the WAN 2556 via other means for establishing communications over the WAN 2556, such as by way of the Internet. The modem 2560, which can be internal or external and a wired or wireless device, can be connected to the system bus 2508 via the input device interface 2544. In a networked environment, program modules depicted relative to the computer 2502 or portions thereof, can be stored in the remote memory/storage device 2552. It will be appreciated that the network connections shown are example and other means of establishing a communications link between the computers can be used.

When used in either a LAN or WAN networking environment, the computer 2502 can access cloud storage systems or other network-based storage systems in addition to, or in place of, external storage devices 2516 as described above. Generally, a connection between the computer 2502 and a cloud storage system can be established over a LAN 2554 or WAN 2556 e.g., by the adapter 2558 or modem 2560, respectively. Upon connecting the computer 2502 to an associated cloud storage system, the external storage interface 2526 can, with the aid of the adapter 2558 and/or modem 2560, manage storage provided by the cloud storage system as it would other types of external storage. For instance, the external storage interface 2526 can be configured to provide access to cloud storage sources as if those sources were physically connected to the computer 2502.

The computer 2502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, and/or the like), and telephone. This can include Wireless Fidelity ("Wi-Fi") and BLUETOOTH® wireless technologies. Thus, the communication can be a predefined structure as with a conventional network or simply an ad hoc communication between at least two devices.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and
   a processor that executes at least one of the computer executable components that:
      constructs a machine learning architecture comprising:
         an encoder layer of the machine learning architecture, wherein the encoder layer comprises at least one encoder and at least one machine learning network, and wherein the at least one machine learning network comprises at least one generative adversarial network;
         an intermediate layer of the machine learning architecture that is communicatively coupled to the encoder layer, wherein the intermediate layer comprise at least one bijector node; and
         a decoder layer of the machine learning architecture that is communicatively coupled to the intermediate layer, wherein the decoder layer comprises a mechanistic model that operates as a decoder of the machine learning architecture, and wherein the at least one bijector node transforms a Gaussian distribution generated by the at least one machine learning network to a prior distribution of model parameters of the mechanistic model inputted to the at least one machine learning network; and
      trains the machine learning architecture to identify a causal relationship in the mechanistic model using a parameter space of the mechanistic model as a learned distribution sampled within the at least one generative adversarial network based on a sample subset of outputs of the mechanistic model.

2. The system of claim 1, wherein the at least one generative adversarial network is selected from a group consisting of a conditional generative adversarial network, a regularized generative adversarial network, and a conditional regularized generative adversarial network.

3. The system of claim 1, wherein the at least one generative adversarial network determines a conditional probability associated with the parameter space based on an output of the mechanistic model.

4. The system of claim 1, wherein the machine learning architecture approximates a distribution of the parameter space that is consistent with a single output of the mechanistic model or coherent with a distribution of outputs of the mechanistic model.

5. The system of claim 1, wherein the parameter space is associated with the output and is known.

6. The system of claim 1, wherein the at least one generative adversarial network is a regularized generative adversarial network or a conditional regularized generative adversarial network that comprises at least two discriminator nodes, and wherein a generator node loss function of the regularized generative adversarial network or the conditional regularized generative adversarial network is a weighted sum of losses due to the at least two discriminator nodes.

7. The system of claim 1, wherein the at least one generative adversarial network is a regularized generative adversarial network or a conditional regularized generative adversarial network that generates an input parameter for the mechanistic model which, when forwarded through the mechanistic model, results in mechanistic model outputs that are coherent with a set of observation data characterized by the mechanistic model.

8. The system of claim 7, wherein the input parameter is conditioned on auxiliary variables derived from a source other than the prior distribution accessible to the mechanistic model.

9. The system of claim 1, wherein the mechanistic model is at least of a biophysical model of a biological system or a trained surrogate of the biophysical model of the biological system.

10. The system of claim 9, wherein the parameter space characterizes observations of the biological system.

11. A computer-implemented method, comprising:
constructing, by at least one processor of a system, a machine learning architecture comprising:
an encoder layer of the machine learning architecture, wherein the encoder layer comprises at least one encoder and at least one machine learning network, and wherein the at least one machine learning network comprises at least one generative adversarial network;
an intermediate layer of the machine learning architecture that is communicatively coupled to the encoder layer, wherein the intermediate layer comprise at least one bijector node; and
a decoder layer of the machine learning architecture that is communicatively coupled to the intermediate layer, wherein the decoder layer comprises a mechanistic model that operates as a decoder of the machine learning architecture, and wherein the at least one bijector node transforms a Gaussian distribution generated by the at least one machine learning network to a prior distribution of model parameters of the mechanistic model inputted to the at least one machine learning network; and
training, by the at least one processor, the machine learning architecture to identify a causal relationship in the mechanistic model using a parameter space of the mechanistic model as a learned distribution sampled within the at least one generative adversarial network based on a sample subset of outputs of the mechanistic model.

12. The computer-implemented method of claim 11, wherein the at least one generative adversarial network is selected from a group consisting of a conditional generative adversarial network, a regularized generative adversarial network, and a conditional regularized generative adversarial network.

13. The computer-implemented method of claim 11, wherein the machine learning architecture a distribution of the parameter space that is consistent with a single output of the mechanistic model or coherent with a distribution of outputs of the mechanistic model.

14. The computer-implemented method of claim 11, wherein the parameter space is associated with the output and is known.

15. The computer-implemented method of claim 11, wherein the at least one generative adversarial network is a regularized generative adversarial network or conditional regularized generative adversarial network that generates an input parameter for the mechanistic model that, when forwarded through the mechanistic model, results in mechanistic model outputs that are coherent with a set of observation data characterized by the mechanistic model.

16. A computer program product for autonomous model parameter inferencing, the computer program product comprising a computer readable storage medium having program instructions embodied therewith, the program instructions executable by a processor to cause the processor to:
construct a machine learning architecture comprising:
an encoder layer of the machine learning architecture, wherein the encoder layer comprises at least one encoder and at least one machine learning network, and wherein the at least one machine learning network comprises at least one generative adversarial network;
an intermediate layer of the machine learning architecture that is communicatively coupled to the encoder layer, wherein the intermediate layer comprise at least one bijector node; and
a decoder in a decoder layer of the machine learning architecture that is communicatively coupled to the intermediate layer, wherein the decoder layer comprises a mechanistic model that operates as a decoder of the machine learning architecture, and wherein the at least one bijector node transforms a Gaussian distribution generated by the at least one machine learning network to a prior distribution of model parameters of the mechanistic model inputted to the at least one machine learning network; and
train the machine learning architecture to identify a causal relationship in the mechanistic model using a parameter space of the mechanistic model as a learned distribution sampled within the at least one generative adversarial network based on a sample subset of outputs of the mechanistic model.

17. The computer program product of claim 16, wherein the at least one generative adversarial network is selected from a group consisting of a conditional generative adversarial network and a regularized generative adversarial network or conditional regularized generative adversarial network.

18. The computer program product of claim 16, wherein the at least one generative adversarial network determines a conditional probability associated with the parameter space based on an output of the mechanistic model.

19. The computer program product of claim 16, wherein the at least one generative adversarial network is a regularized generative adversarial network or a conditional regularized generative adversarial network that generates an input parameter for the mechanistic model that, when forwarded through the mechanistic model, results in mechanistic model outputs that are coherent with a set of observation data characterized by the mechanistic model.

20. The computer program product of claim 16, wherein the mechanistic model is a biophysical model of a biological system.

* * * * *